July 1, 1952 M. JAMES ET AL 2,601,986
AUTOMATIC RECORD CHANGER PHONOGRAPH
Filed April 18, 1946 13 Sheets-Sheet 1

INVENTORS
MAXWELL JAMES
BERNE N. FISHER
BY
James V. Franklin
ATTORNEYS

July 1, 1952 M. JAMES ET AL 2,601,986
AUTOMATIC RECORD CHANGER PHONOGRAPH
Filed April 18, 1946 13 Sheets-Sheet 2
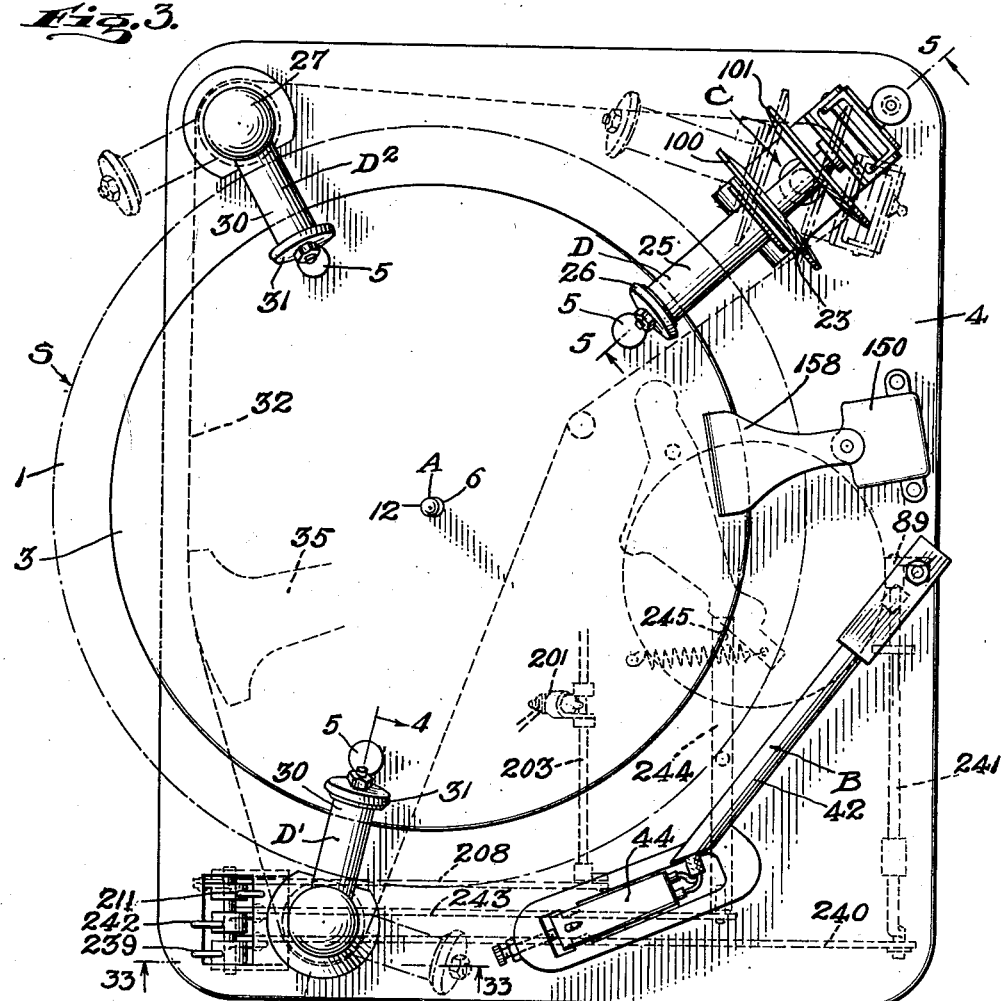
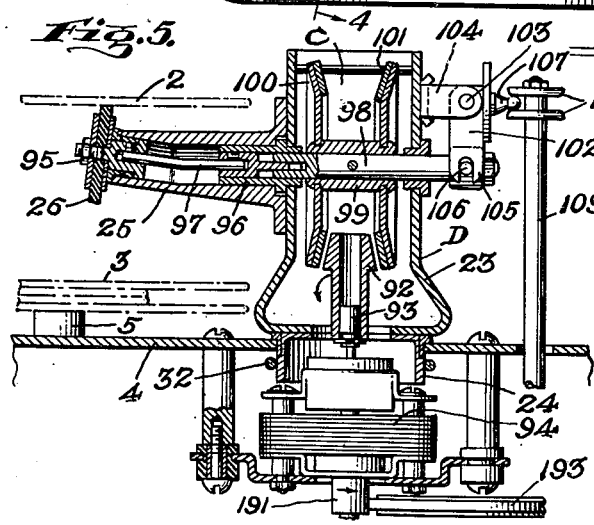
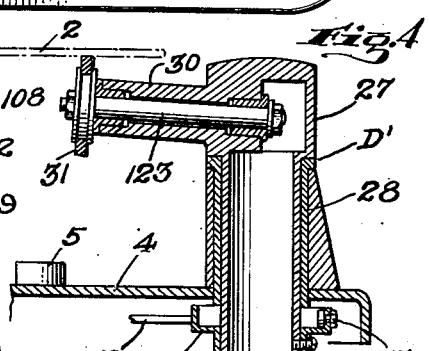
INVENTORS
MAXWELL JAMES
BERNE N. FISHER
BY
James F. Franklin
ATTORNEYS July 1, 1952 M. JAMES ET AL 2,601,986
AUTOMATIC RECORD CHANGER PHONOGRAPH
Filed April 18, 1946 13 Sheets-Sheet 3

INVENTORS
MAXWELL JAMES
BERNE N. FISHER
BY
James Franklin
ATTORNEYS

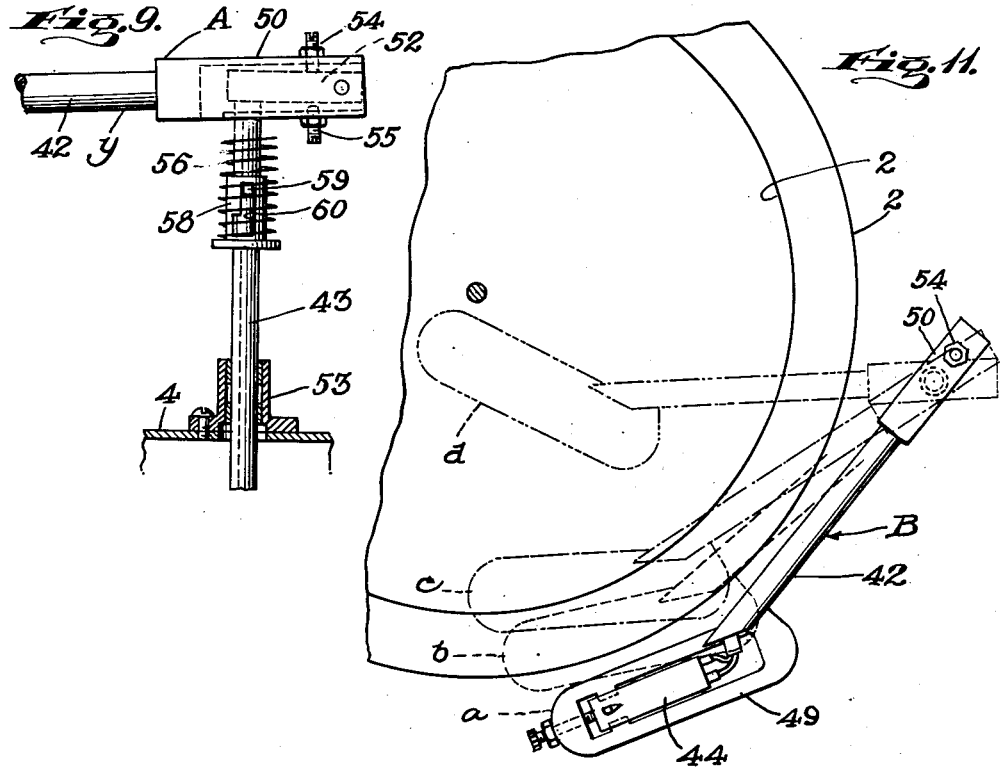
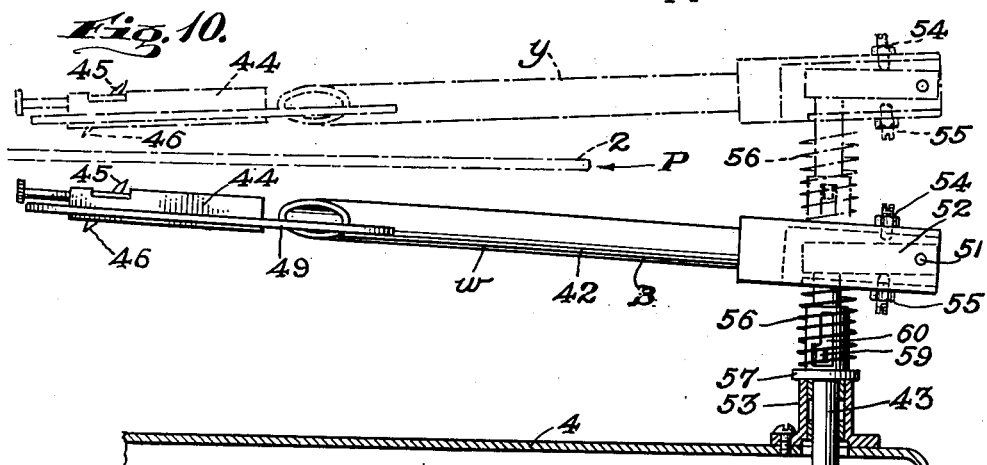

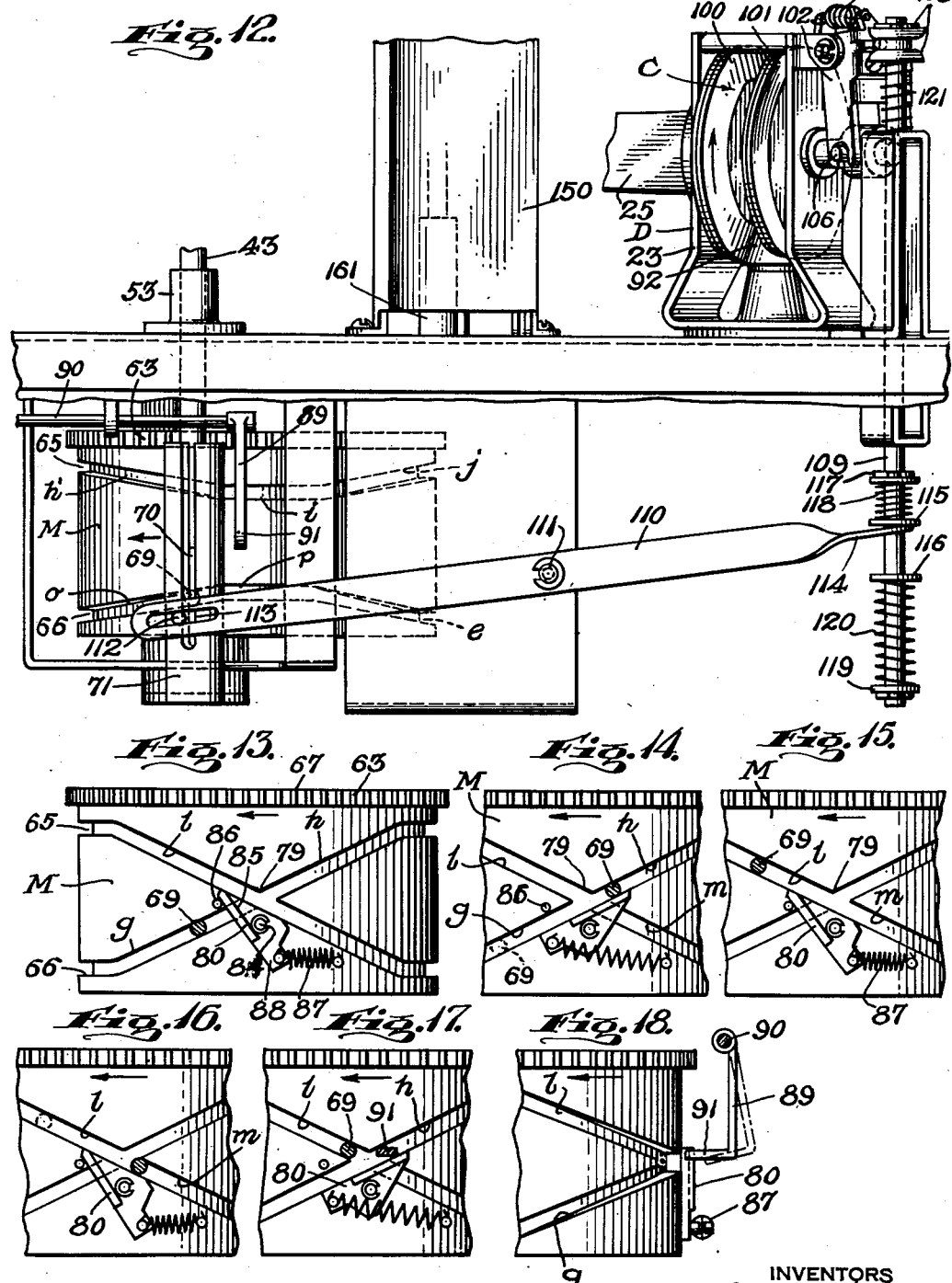

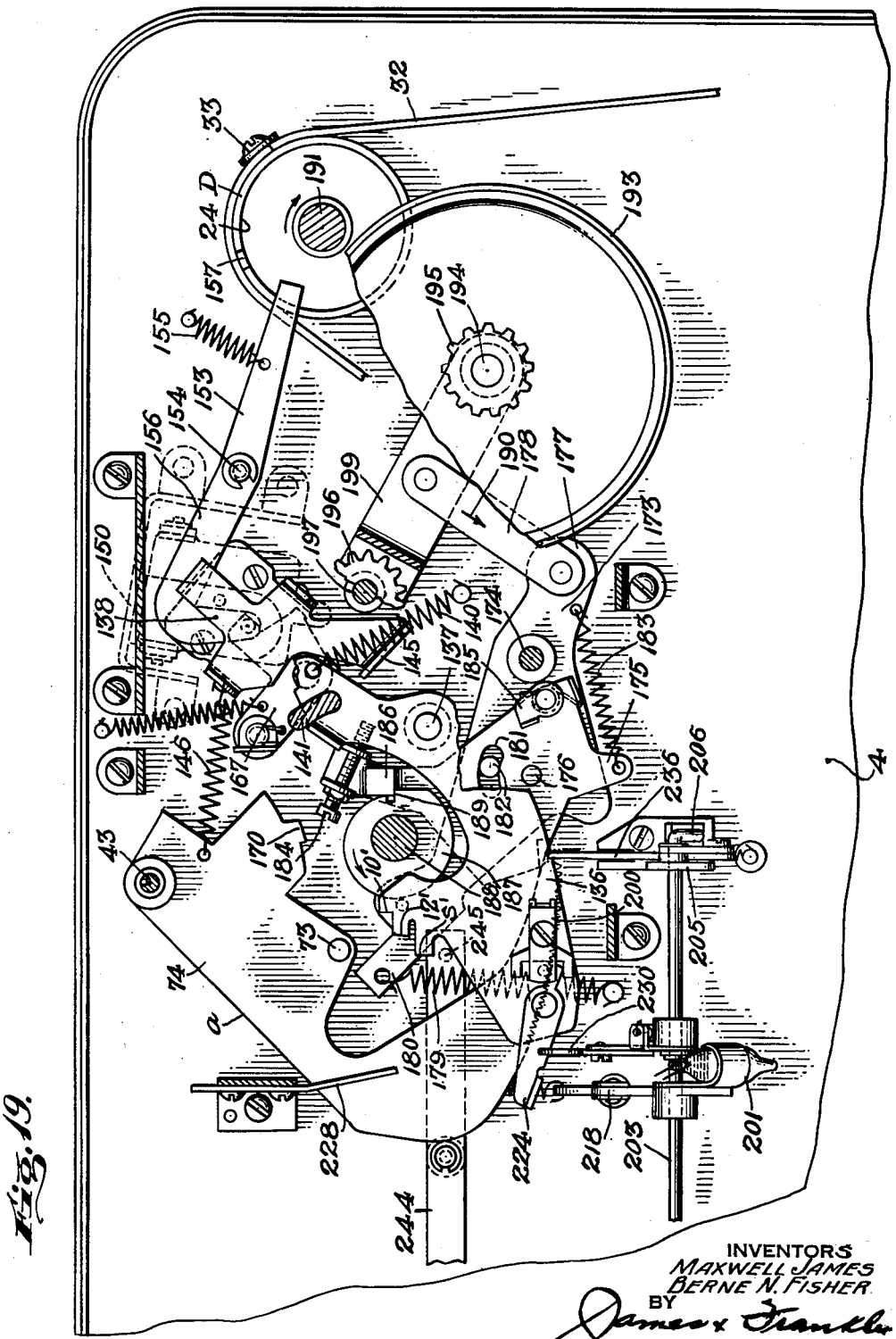

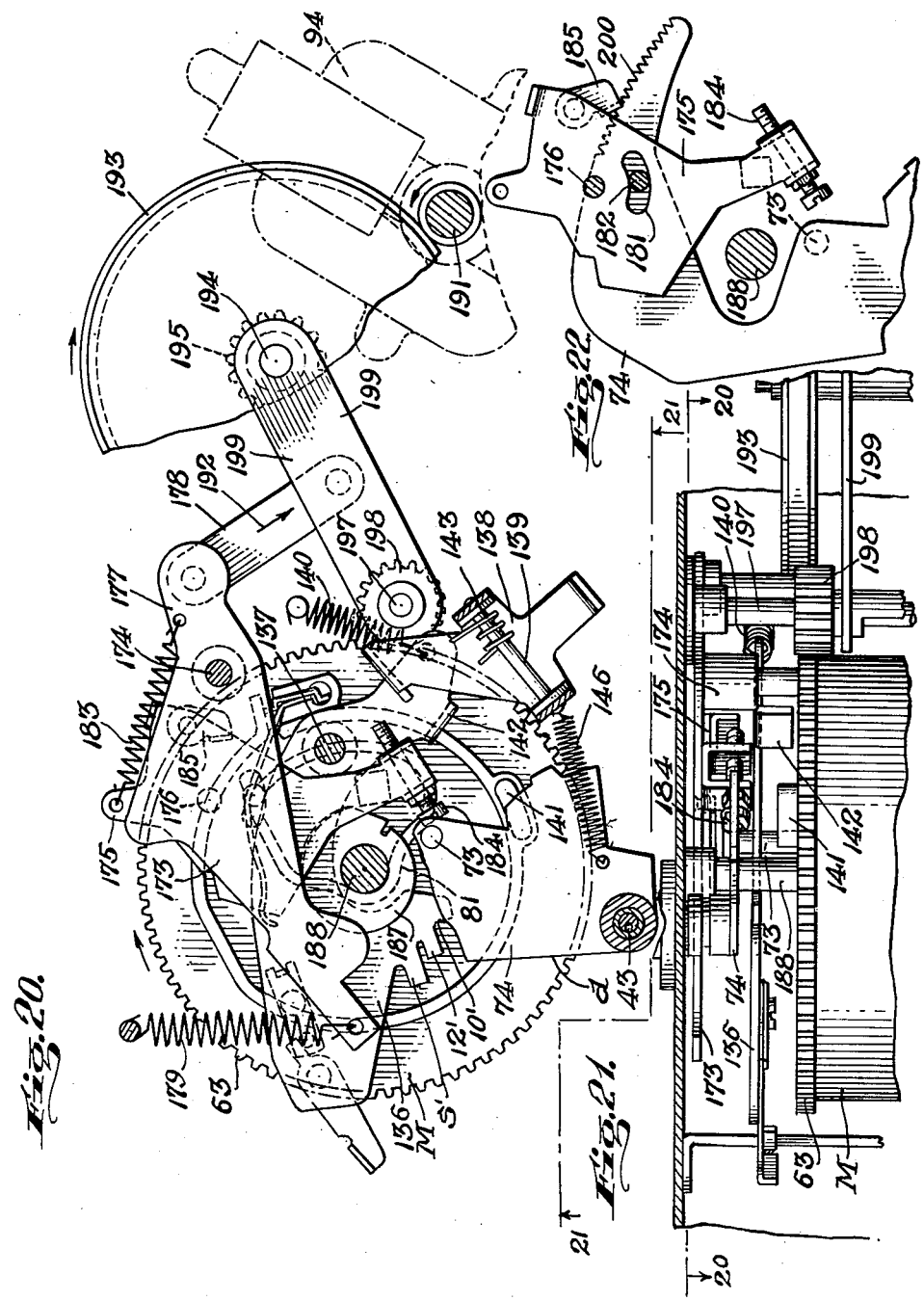

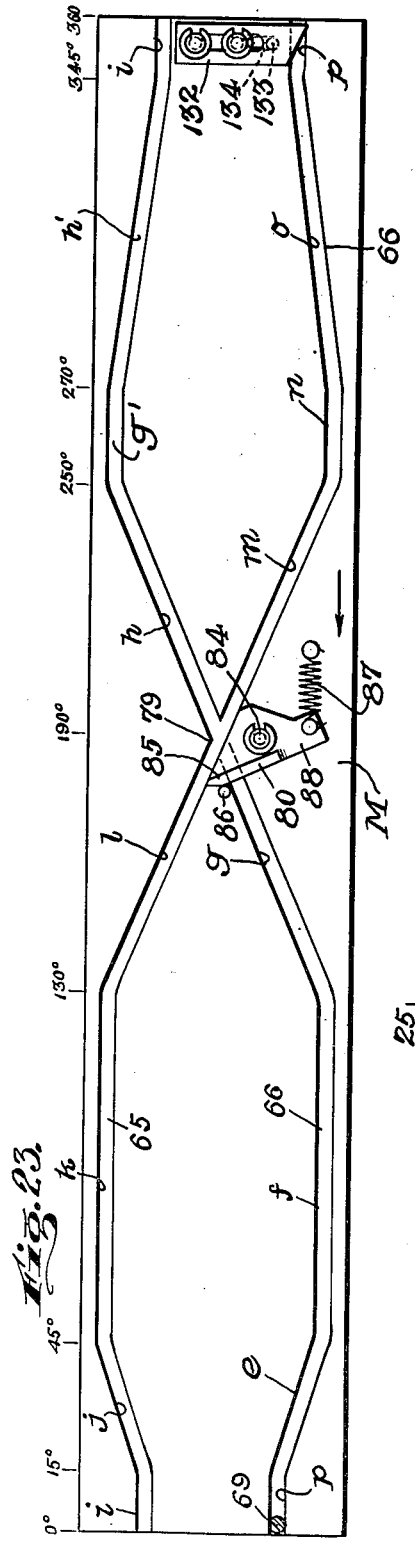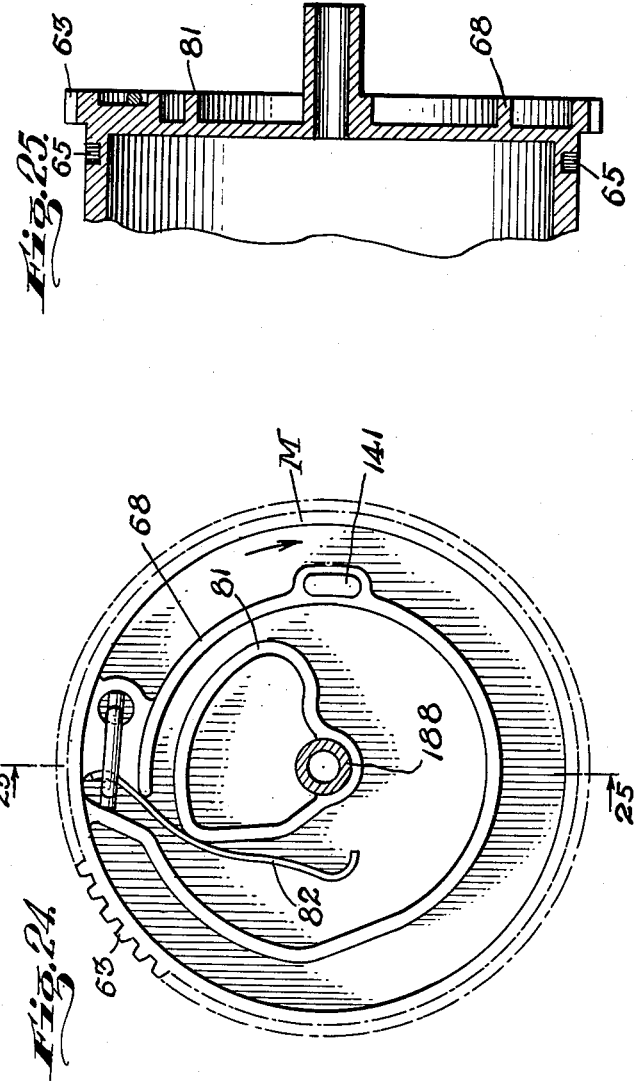

July 1, 1952 M. JAMES ET AL 2,601,986
AUTOMATIC RECORD CHANGER PHONOGRAPH
Filed April 18, 1946 13 Sheets-Sheet 9
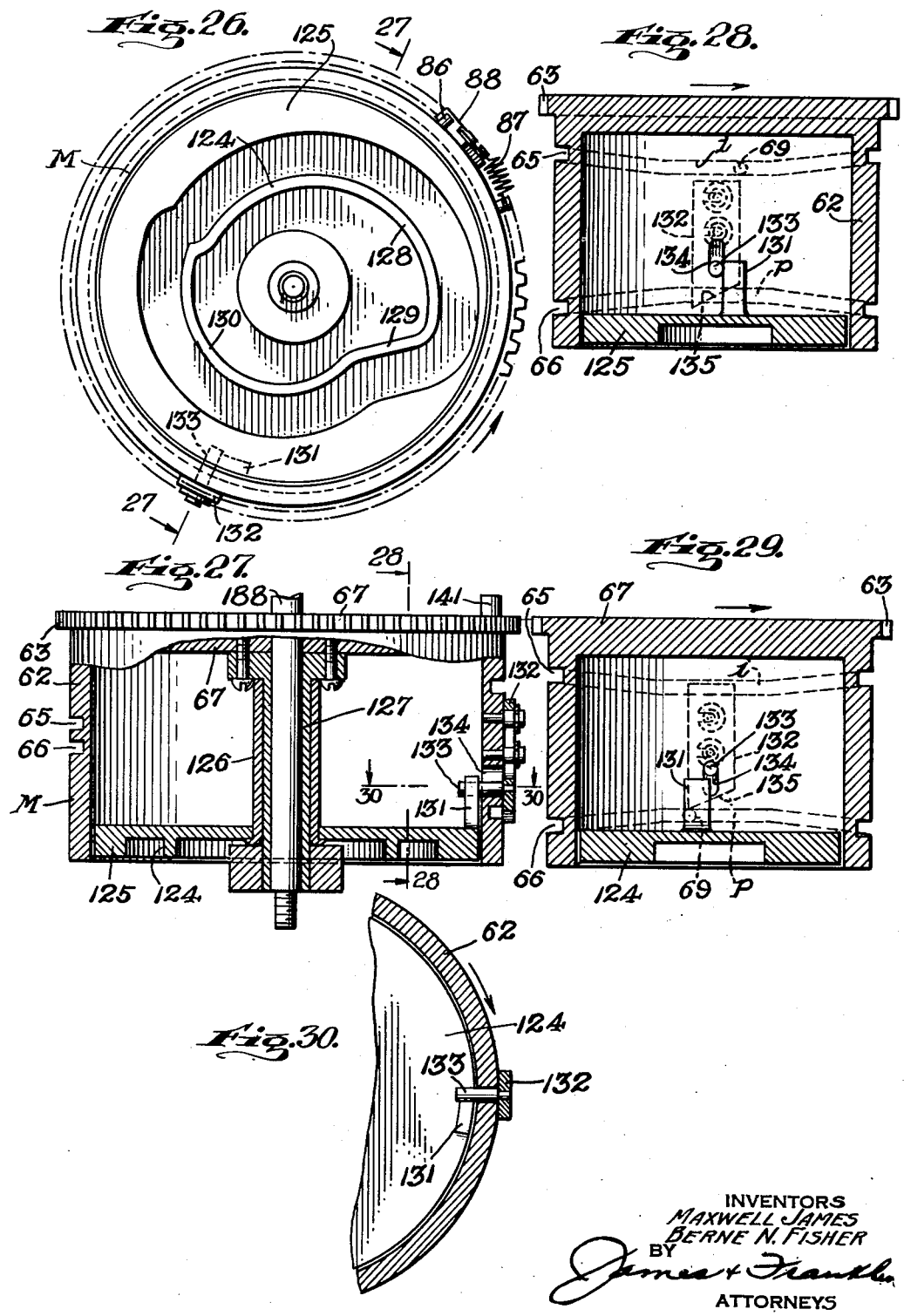
INVENTORS
MAXWELL JAMES
BERNE N. FISHER
BY
ATTORNEYS July 1, 1952  M. JAMES ET AL  2,601,986
AUTOMATIC RECORD CHANGER PHONOGRAPH
Filed April 18, 1946  13 Sheets-Sheet 10
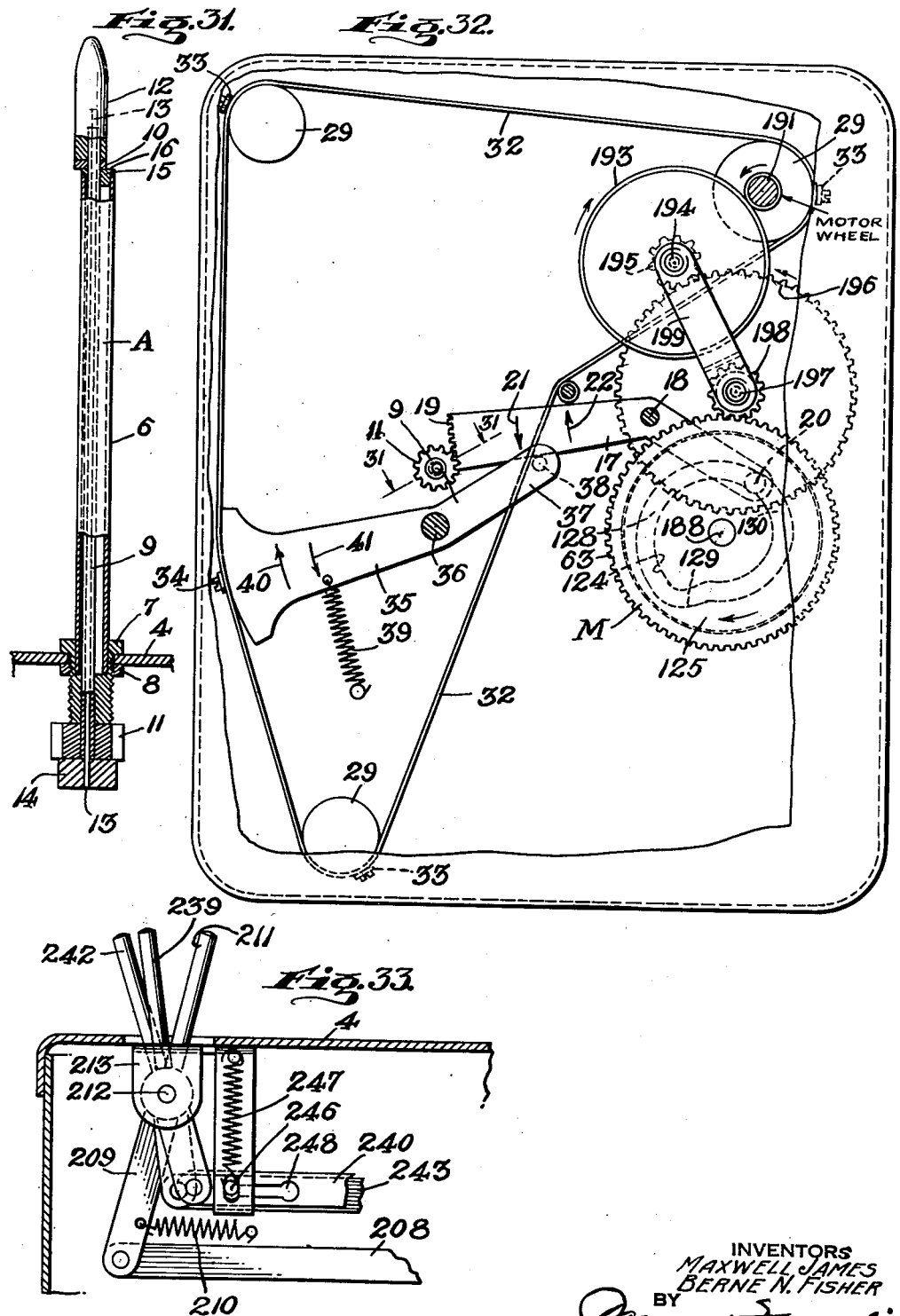
INVENTORS
MAXWELL JAMES
BERNE N. FISHER
BY
James N Franklin
ATTORNEYS July 1, 1952   M. JAMES ET AL   2,601,986
AUTOMATIC RECORD CHANGER PHONOGRAPH
Filed April 18, 1946   13 Sheets-Sheet 11
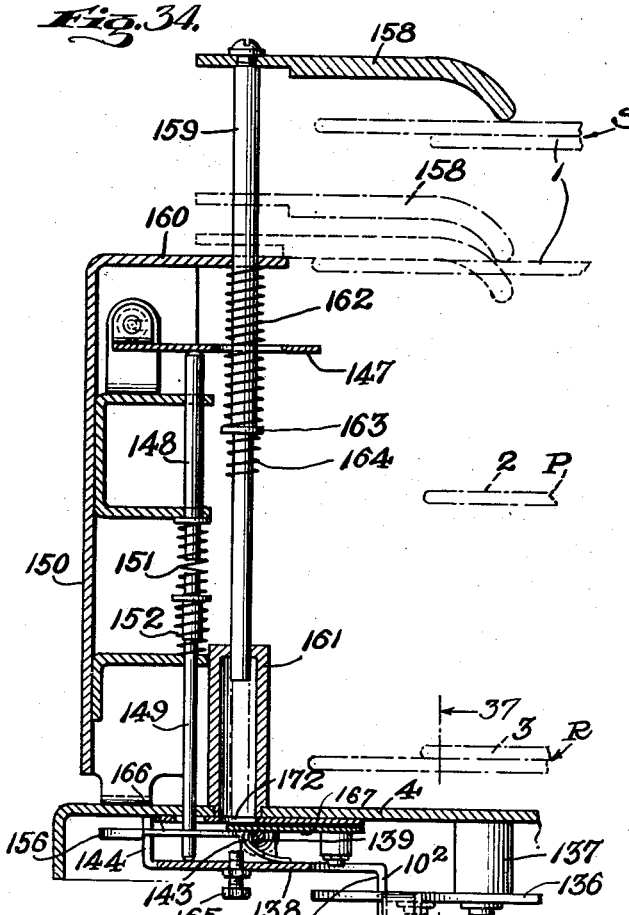
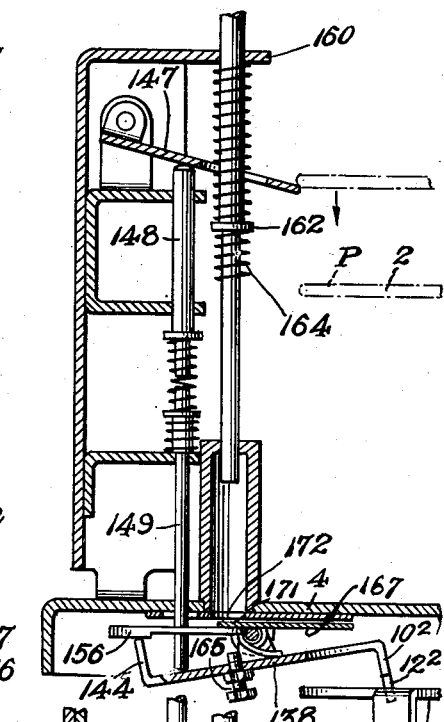
INVENTORS
MAXWELL JAMES
BERNE N. FISHER
BY
James & Franklin
ATTORNEYS

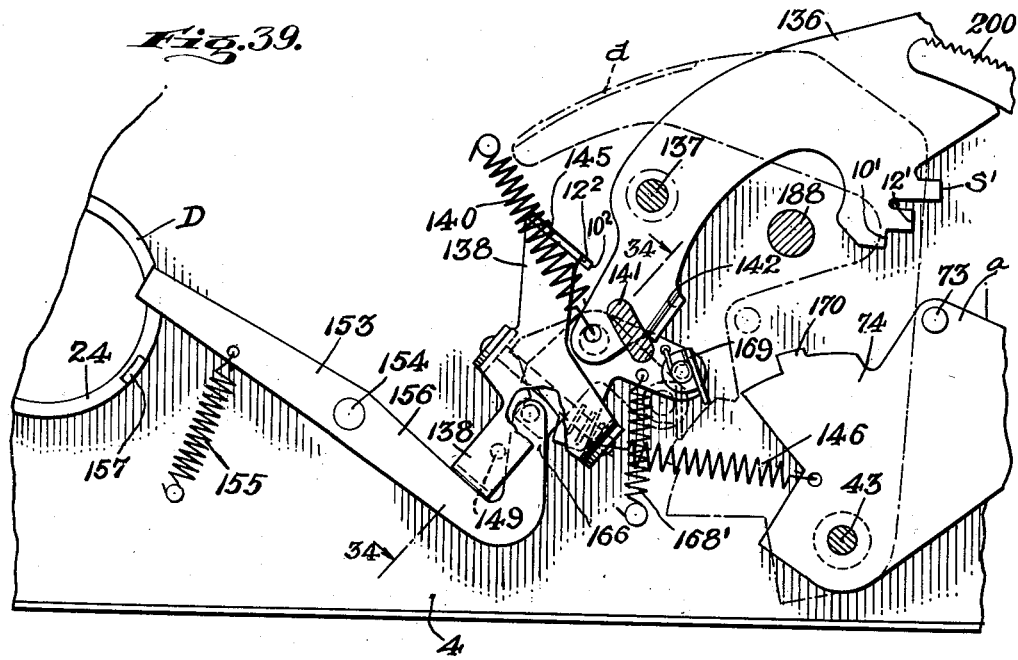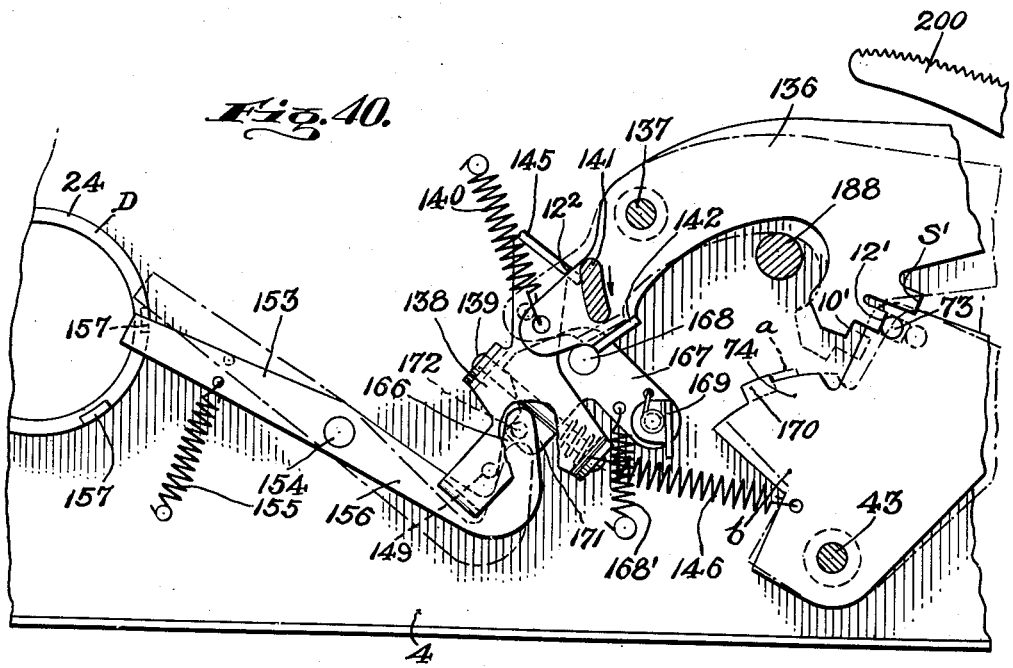

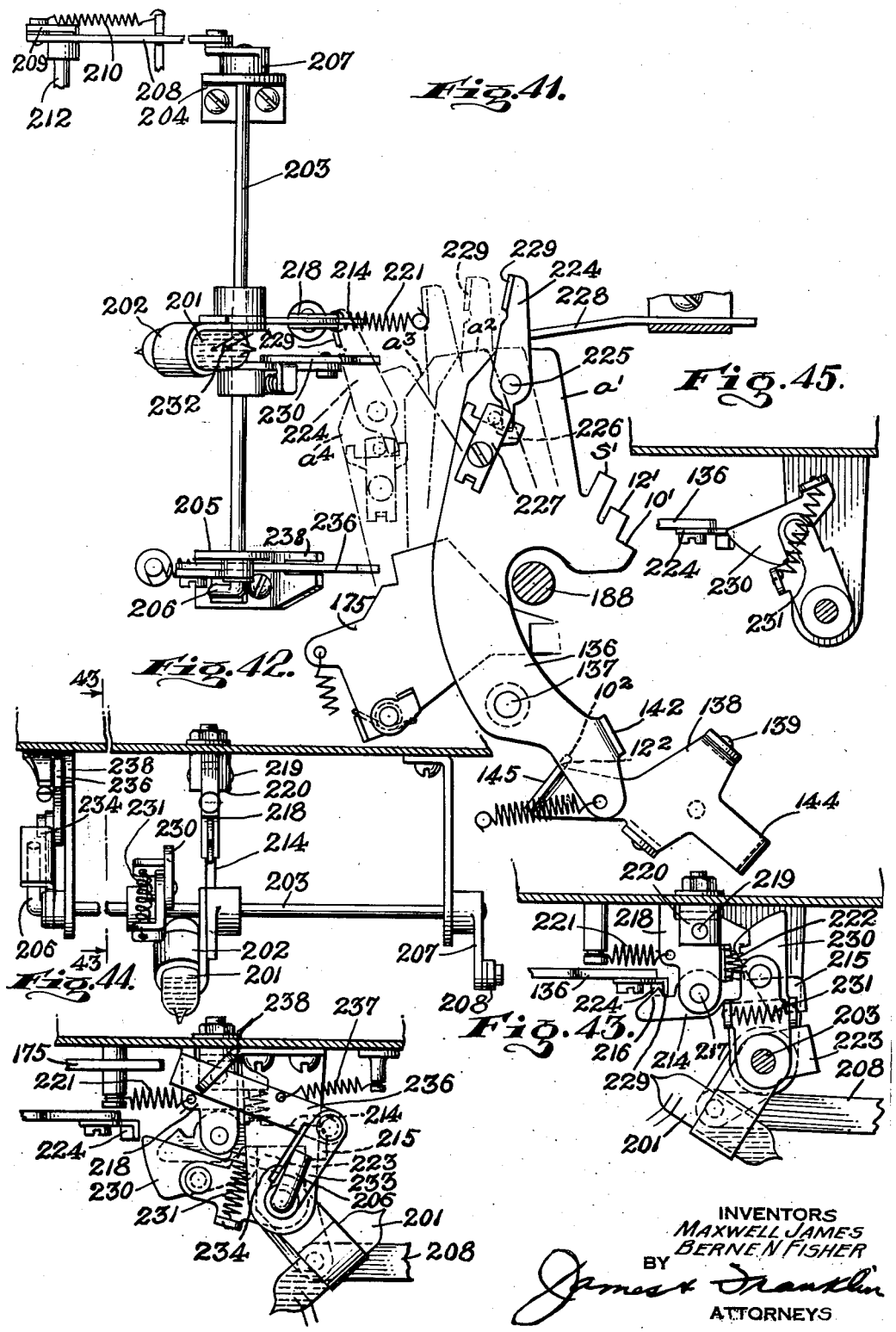

Patented July 1, 1952

2,601,986

UNITED STATES PATENT OFFICE 2,601,986

AUTOMATIC RECORD CHANGER PHONOGRAPH

Maxwell James, New Rochelle, and Berne N. Fisher, New York, N. Y., assignors to General Instrument Corporation, Elizabeth, N. J., a corporation of New Jersey Application April 18, 1946, Serial No. 663,016

12 Claims. (Cl. 274—10)

This invention relates to a record changer phonograph and more particularly to a record changer phonograph of the record drop-feed or gravity-feed type in which the records may be automatically played on both of their opposite sides.

The prime object of our present invention centers about the provision of a record changer phonograph in which there are arranged in vertical superposed relation a record supply station, a record playing station and a played record receiving station, and in which the records drop-fed individually from the supply station are played on their opposite sides at the playing station from which the individual played records are then drop-fed to the record receiving station.

Another object of our present invention is directed to the provision of such a record changer phonograph designed to permit a supply of records to be selectively played either on their opposite sides or on one side only.

A further object of the invention pertains to the provision of a record changer phonograph of this nature in which either or both of the above stated objects may be achieved or carried out with a record supply containing intermixed records of different sizes such as 10 and 12 inch records.

In carrying out these stated objects, it is the further aim and achievement of the present invention to produce:

(1) A new and improved reproducer or tone arm assembly for playing the opposite sides of a record at a playing station;

(2) A new and improved tone arm assembly and operating mechanism for the record changer;

(3) A novel mechanism for automatically controlling the initial playing position of the tone arm for a record changer in which the record at the playing station is to be played on its opposite sides or selectively on one side only; and (4) A novel mechanism for bringing the phonograph record changer to a stop after the last record of the record supply fed to the playing station has been played on its two sides at the playing station.

To the accomplishment of the foregoing and such other objects as may hereinafter appear, the invention pertains to the record changer phonograph and the various component mechanisms thereof, in combination and subcombination, as sought to be defined in the appended claims and as described in the following specification taken together with the accompanying drawings in which:

Fig. 3 is a top plan view thereof drawn to a somewhat larger scale;

Fig. 4 is a fragmentary view taken in cross-section in the plane of the line 4—4 of Fig. 3;

Fig. 5 is a fragmentary view taken in cross-section in the plane of the line 5—5 of Fig. 3 but showing the parts in a somewhat different position than the position shown in Fig. 3;

Fig. 6 is a vertical elevational view with parts shown in section of the reproducer or tone arm and its supporting and operating mechanism;

Fig. 7 is a view of the latter taken in cross-section in the plane of the line 7—7 of Fig. 6;

Fig. 8 is a fragmentary view of the tone arm and support showing the same in one of the positions assumed during its operation;

Fig. 9 is a view similar to Fig. 8 showing the parts in a different position of operation;

Fig. 10 is a view of the reproducer or tone arm and the support therefor corresponding to Fig. 6 but showing the parts in a different position;

Fig. 11 is a fragmentary top plan view (with a part shown in section) of part of the phonograph apparatus depicting a movement of the tone arm;

Fig. 12 is an elevational view showing the related mechanism for operating the tone arm and the record rotating means of the phonograph;

Fig. 13 is an elevational view of the cam mechanism for operating the tone arm showing one operative phase thereof;

Figs. 14 to 18 are fragmentary views of this cam mechanism showing sequential different operative phases thereof;

Fig. 19 is a bottom plan view drawn to an enlarged scale (compared to Fig. 3) showing controlling parts of the phonograph and depicting one stage of the operation thereof;

Fig. 20 is a top plan view of the main parts of the mechanism shown in Fig. 19 and depicting a different stage of the operation thereof, Fig. 20 being a view taken in cross-section in the plane of the line 20—20 of Fig. 21;

Fig. 21 is a view of Fig. 20 taken in the planes of the line 21—21 of Fig. 20;

Fig. 22 is a top plan view of part of the mechanism shown in Figs. 19 and 20 but in a different stage of operation;

Fig. 23 is a development view of the cam mechanism shown in Fig. 13;

Fig. 24 is a top plan view of the cam shown in Fig. 13 but drawn to a larger scale;

Fig. 25 is a fragmentary view of the cam of Fig. 24, taken in cross-section in the plane of the line 25—25 of Fig. 24;

Fig. 26 is a bottom plan view of said cam mechanism;

Fig. 27 is a view of said cam mechanism taken largely in section in the plane of the line 27—27 of Fig. 26;

Fig. 28 is a view thereof taken in section in the plane of the line 28—28 of Fig. 27 and showing the parts in one stage of operation;

Fig. 29 is a view similar to Fig. 28 but shows the parts in a different stage of operation;

Fig. 30 is a fragmentary view taken in cross-section in the plane of the line 30—30 of Fig. 27;

Fig. 31 is an elevational view taken partly in section in the plane of the line 31—31 of Fig. 32 of the central spindle of the phonograph with its appurtenant mechanism;

Fig. 32 is a top plan view with parts broken away and other parts shown in section of certain operating mechanism for the phonograph located below the platform support thereof;

Fig. 33 is a view of the manual lever controls taken in cross-section in the plane of the line 33—33 of Fig. 3;

Fig. 34 is an elevational view with parts shown in section taken in the plane of the line 34—34 of Fig. 39, of mechanism for controlling the initial playing position of the tone arm and for controlling the operation of the stop means for the phonograph;

Fig. 35 is a view similar to Fig. 34 showing the parts in a different operative position;

Fig. 36 is a fragmentary view of the mechanism shown in Fig. 34 and showing the parts in another different operative position;

Fig. 37 is a view taken in cross-section in the plane of the line 37—37 of Fig. 34 and showing the parts in one operative position;

Fig. 38 is a view of parts shown in Fig. 37 and taken from the same viewpoint and showing the parts in a different operative position;

Fig. 39 is a top plan view of the mechanism for determining the initial playing position of the tone arm and for determining the stopping of the phonograph, this view being related to Figs. 34 to 38;

Fig. 40 is a view similar to Fig. 39 showing the parts in a different operative position;

Fig. 41 is a bottom plan view of the mechanism for controlling the stopping operation of the phonograph;

Fig. 42 is a side elevational view of the apparatus shown in Fig. 41;

Fig. 43 is a front view of the apparatus of Fig. 42 taken in section in the plane of the line 43—43 of Fig. 42;

Fig. 44 is a left side elevational view of the apparatus shown in Fig. 42; and

Fig. 45 is a detail view of part of the apparatus shown in Figs. 41 to 44.

*General assembly and operation of the record feed and playing mechanisms*

Figure 1:
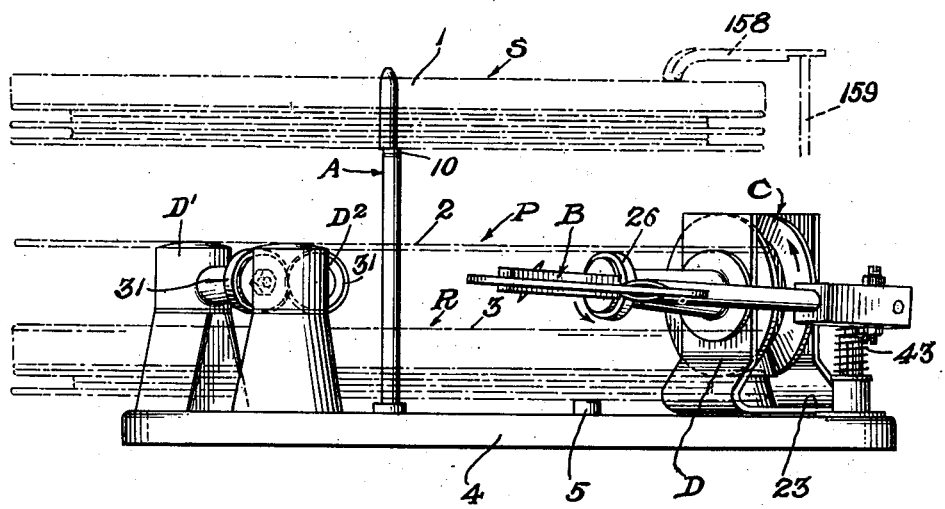
Fig. 1 is an elevational view of the top of the record changer phonograph of our invention showing the position the parts assume when ready for bottom side playing of a record.
Figure 2:
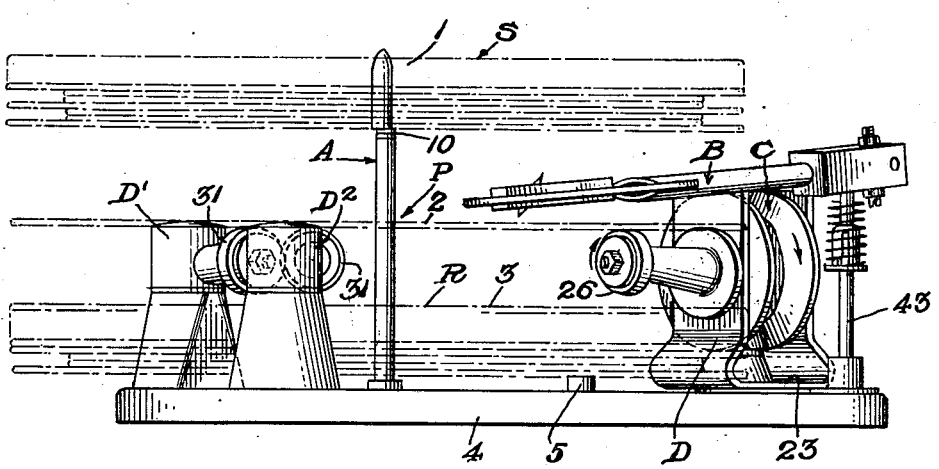
Fig. 2 is a similar view thereof and showing the position the parts assume when ready for top side playing of a record.

Referring now more in details to the drawings, and referring first to Figs. 1 and 2 thereof, the record changer phonograph of the present invention comprises in one of its broader phases a drop-feed, double-side-playing record changer phonograph having in vertical superposed relation a record supply station generally designated as S, a record playing station generally designated as P, and a played record receiving station generally designated as R, and comprising means for supporting one or more records such as the supply of records 1 at the record supply station, means for drop-feeding a record from the supply station such as the record 2 to the playing station, means at the record playing station for playing first one side such as the under side of the record 2 (see Fig. 1) and then the other side such as the top side of the record 2 (see Fig. 2), and means for then drop-feeding the played record 2 to the played record receiving station such as is illustrated by the records 3 at this latter station.

The means for supporting the record supply at the record supply station S may take the form of any known magazine supporting means for record changers of the drop-feed type, and in the present embodiment of the invention such means is combined with the means for drop-feeding a record from the record supply to the record playing station, this combinative means being embodied in a manner to be described more in detail hereinafter in the central spindle device generally designated as A. This central spindle device supports a stack of records 1 at the supply station as depicted in Figs. 1 and 2 of the drawings, from which the bottommost record is drop-fed in the operation of the machine to the playing station P, guided thereto by the said central spindle. The record 2 is supported as a single record at the playing station, and after its opposite sides are played it is drop-fed to and stacked on a stationary platform 4 which may be provided with the receiving stud supports 5, 5, movement from the playing station to the record receiving station being also guided by the central spindle A, the played records stacking up into the record stack 3 shown in Figs. 1 and 2.

The means at the record playing station P for playing first one side and then the other side of the record comprises in combination, a reproducer or tone arm B which is operable to a position for playing the bottom side of the record depicted in Fig. 1 and to a position for playing the top side of the record depicted in Fig. 2, and a record rotating mechanism generally designated as C which is operable as indicated by the arrows in Figs. 1 and 2 of the drawings for rotating the record 2 in the playing position first in one direction for bottom side playing and then in the reverse direction for top side playing.

Preferably the record rotating means C has embodied therein means for supporting the record at the playing station and this part of the mechanism generally designated as D is combined with two other spaced supports D' and $D^2$ for receiving and supporting the record at the playing station.

These record receiving and supporting means D, D' and $D^2$ are also preferably made to constitute the means for drop-feeding the record from the playing station to the played record receiving station after both sides of the record have been played at the playing station or after one side only of the record has been played at the record playing station if and when such latter method of playing is selected as the operation for the phonograph.

The record receiving and supporting means, D, D' and $D^2$, and their operation to receive a record at the playing station and to drop-feed a record therefrom to the record receiving station is best depicted in Fig. 3 of the drawings (taken together with Figs. 1 and 2). When moved to the full line position shown in Fig. 3, these record receiving and supporting means D, D' and D² are in a position to intercept and receive the lowermost record dropped from the stack supply 1 and to support the same for a playing operation. As will later develop, this means also embodies driving elements which rotate the record at the playing station in either of its opposite directions. When a record has been played at the playing station, the record receiving and supporting means D, D' and D² are then moved (simultaneously) to their dot-and-dash line positions shown in Fig. 3 and in their movement to such positions the played record 2 is released from the said supporting means and therefore is drop-fed to the record receiving station R. When returned to their full line positions, the receiving and supporting means D, D' and D² intercept, receive and drive the next record fed from the bottom of the record stack 1 at the supply station.

*Record supporting and record feeding mechanism*

The mechanism for supporting the records in stack at the record supply station S and individually at the record playing station P and for feeding the same from the supply station to the playing station and from the playing station to the record receiving station may be first described and by reference to Figs. 1 to 5 and Figs. 31 and 32 of the drawings.

For supporting a stack of records at the supply station and feeding individual records therefrom to the playing station, the central spindle mechanism A aforementioned is provided. This central spindle mechanism is of a known construction. It comprises (see Fig. 31) a spindle sleeve 6 fixed to the platform 4 by means of a gland 7 and a nut 8 within which is eccentrically mounted an inner sleeve 9 to the top of which is affixed a button 10 and to the bottom of which is affixed a pinion 11, the inner sleeve extending at its upper end into a spindle cap 12. The cap 12 is affixed to a shaft 13 located and rotatable within the inner sleeve 9 to the bottom of which shaft is fixed a collar 14. Thus both the inner sleeve 9 and the shaft 13 are eccentrically and rotatably mounted in the spindle sleeve 6. The top of the spindle sleeve 6 which may be formed by the plug or closure 15 has a top surface which forms a shoulder 16.

The spindle cap 12 thus eccentrically mounted is movable from the eccentric position shown in Figs. 1 to 3 and 31 to a position concentric with the sleeve 6. In its eccentric position the cap 12 receives the record stack 1, the bottommost record of which rests on the button 10 (see Fig. 1 and Fig. 2). For removing a played stack of records from the record receiving station R, the spindle cap 12 is moved to its concentric position. When in this position, the stacked records at the record receiving station may be lifted and removed from the central spindle. The collar 14 holds the spindle cap in its two positions, this collar being engaged by a leaf spring (not shown).

The button 10 acts as the record feeding means for feeding the record from the supply station to the playing station, actuated by the inner sleeve 9 and the pinion 11. The pinion 11 is connected to be oscillated by a cam operated lever 17 (Fig. 32) fulcrumed at 18 and provided with rack teeth 19 meshing with the pinion, the lever being provided at its opposite arm with a cam follower 20. During an operating cycle of the machine (for a record change), the lever 17 is oscillated. In its forward stroke as indicated by the arrow 21 (Fig. 32), the pinion 11 and consequently the button 10 are oscillated over an angle of 180 degrees. When this takes place, the button 10 moves from its record supporting position shown in Figs. 1 and 2 to a position 180 degrees therefrom and concentric with the spindle cap 12 and thus to the position shown in Fig. 31. The record stack 1 therefore drops a distance equal to the thickness of the button 10 (the thickness of a record), and the stack is then supported in position with the lowermost record engaging the top shoulder 16 of the spindle sleeve 6. The button 10 is at such time located within the hole of the bottommost record. Completing the oscillating cycle, that is, when the lever moves through its return stroke indicated by the arrow 22 (Fig. 32), the button 10 moves back to its position shown in Figs. 1 and 2 and thereby moves the lowermost record to a position concentric with the spindle sleeve 6; this lowermost record, being thereby freed from the stack, drops from the stack to the playing position P. The button 10 in this return part of its cycle also interposes itself as a support for the remaining records in the stack with the result that the remaining records are then supported in the condition shown in Figs. 1 and 2.

The supporting means for the record at the playing station and the means for feeding a played record to the receiving station comprising the supports D, D' and D² are shown in detail in Figs. 4 and 5, Fig. 4 representing the construction of each of the supporting means D' and D².

For the record supporting and drop-feeding operation, the supporting means D (see particularly Fig. 5) comprises a mount 23, here shown U-shaped, fitted to a collar 24, the latter oscillatably mounted in the platform 4, and an arm 25 secured to and extending transversely from the mount 23, the said arm carrying at its end a record receiving element here in the form of a driving wheel 26. By means of this construction, the supporting means D is oscillatable between the full and dot-and-dash line positions shown in Fig. 3.

The supporting means D' (and D²) comprises as shown in Fig. 4 a mount 27, here shown as tubular in form, oscillatable in a sleeve 28 fixed to the platform 4, a collar 29 being attached to the bottom of the mount, and an arm 30 extending transversely inwardly of the mount, the said arm being provided at its inner end with a record receiving element, here in the form of an idler wheel 31. By means of this construction, the supporting means D' (and D²) is oscillatable on the supporting platform between the full and the dash-dot line positions shown in Fig. 3.

Simultaneous oscillating movement is imparted to all three supporting means D, D' and D² by means of a band 32 (see particularly Fig. 32) which is secured at the several points shown to the collars 24 and 29 by means of the securing elements 33, 33, the band 32 being connected by the securing element 34 to a lever 35 fulcrumed as at 36 having a free arm 37 provided with a pin 38 which is engaged by the rack arm of the lever 17, the lever 35 being spring-loaded for return movement by means of the spring 39. By reference to Fig. 32 it will now be seen that the lever 35 has a forward oscillating stroke represented by the arrow 40 and a return oscillating stroke represented by the arrow 41, these strokes being in response to the oscillating forward and return strokes imparted to the actuating lever 17.

Upon the inward stroke of the lever 35 the supporting means D, D' and D² are thus moved from a record supporting to a record non-supporting position (Fig. 3), thus releasing a played record and permitting the same to drop-feed to the record receiving station R; upon the return stroke of the lever 35, the record supporting means are oscillated back to their return position for intercepting a record drop-fed to the playing station from the supply station and for supporting (as well as driving) such intercepted record.

The relation between the cycle of operation of the two drop-feeding means may be conveniently described at this point. Upon the forward stroke of the lever 17 and, therefore, upon the forward stroke of the lever 35, a record supported at the playing station is released and is drop-fed to the record receiving station. Upon the return stroke of the lever 17 and consequently upon the return stroke of the lever 35, the supporting means D, D' and D² move into a position for intercepting and receiving a record to be played. It is at the end of this return stroke that the feeding button 10 moves the bottommost record of the supply stack to the spindle concentric position, and it is thus at the end of this described cycle that the new record is fed from the supply station S to the playing station P.

Tone arm and support

The reproducer or tone arm and its support are designed for automatically first playing one side and then the other side of a record at the playing station. To this end the tone arm B and its support are vertically movable for successively positioning the tone arm first on one side of the record and then on the other side of the record, the latter being fixed in a horizontal plane, the tone arm and its support being also automatically moved horizontally into and out of playing position. The tone arm and support and these movements imparted thereto are particularly illustrated in Figs. 6 to 10 of the drawings.

Referring now to Figs. 6 to 10 of the drawings, the tone arm and support comprise a reproducer or tone arm 42 mounted on a support 43, the tone arm being provided at its playing end with a pick-up device 44 which may be of the crystal type. A single crystal pick-up may be provided having on its opposite sides the two styli 45 and 46 for bottom and top side record playing respectively. Electrical connections to the pick-up device are by way of the conductors 47 which extend through and are housed by the tubular part of the tone arm 42. The tone arm may conveniently be formed by a central tubular part 48, a terminal plate part 49 which supports the pick-up, and an opposite terminal box part 50. The tone arm is pivotally mounted for movement within limits in a vertical plane on and relative to the support 43 by being pivotally mounted at 51 to a horizontal bar 52 fixed to and extending from the support 43 which latter, in the embodiment shown, comprises a rod which is mounted for vertical or axial movement in the bearing piece 53 secured to the platform 4 of the phonograph.

The tone arm is movable or swung horizontally into and out of playing position with either the top side or the bottom side of the record at the playing station, four operative positions of which are depicted in Fig. 11 of the drawings. The tone arm is moved vertically to the playing positions for opposite sides of the record, and four of such positions are depicted in Figs. 6, 8, 9 and 10 of the drawings. These positions will now be first described.

When the machine is started, the tone arm 42 11). In the first operating cycle (for either top side or bottom side playing), the tone arm 42 will be automatically positioned in its initial playing position *b* for a 12 inch record 2 and will be automatically positioned in its initial playing position *c* for a 10 inch record 2. The tone arm will then be moved by stylus engagement with the record to the innermost or end position *d*. Upon reaching this end position, the tone arm will then automatically be moved away from record engagement and will be moved to its initial or outside position *a*, and if another record is to be played, will be automatically returned to either its *b* or *c* position depending upon the size of the record to be played.

In the sequence of playing the opposite sides of a record 2, the tone arm will be positioned first for one side playing and then for the other side playing; and in the embodiment here illustrated, the sequence is bottom side playing first and top side playing next. In the movement of the tone arm for this sequence, the tone arm assumes the four different positions *w*, *x*, *y* and *z* depicted in Figs. 6 and 10 of the drawings, these positions being respectively as follows:—bottom side playing with the tone arm out of record engagement, bottom side playing with the tone arm in record engagement, top side playing with the tone arm out of record engagement, and top side playing with the tone arm in record engagement. For bottom side playing, the stylus 45 is operative, and for top side playing, the stylus 46 is operative.

A complete sequence of movement including the horizontal and the vertical movements imparted to the tone arm for the playing of the opposite sides of a record just moved to the playing station P is as follows: the tone arm A is first moved to the position *w—b* for a large size record or *w—c* for a small size record, the tone arm being now ready to be moved into record playing engagement. The tone arm is then moved to the position *x—b* or *x—c* (depending upon the size of the record), and, therefore, into engagement with the initial groove at the bottom of the record. The bottom of the record is then played moving the tone arm to the position *x—d*. At the finish of the playing of the record, the tone arm will be automatically moved first away from record engagement to the position *w—d* and then will be swung outwardly to the position *w—a* at which point the tone arm will be bodily lifted vertically to the position *y—a*. Thereupon the tone arm will then be swung inwardly into its initial playing position *y—b* or *y—c* depending upon the size of the record, whereupon the tone arm will be dropped into playing engagement with the top side of the record into the position *z—b* (or *z—c*). The top side of the record will thereupon be played until the tone arm reaches the inner terminal position *z—d*, whereupon the tone arm will be automatically lifted to the position *y—d* and then swung outwardly to the position *y—a* after which the tone arm will be bodily moved downwardly or dropped to the position *w—a* and thus in a position to be moved into the initial playing position for engagement for the bottom side playing of the next record 2 which is drop-fed to the playing station P.

Figures 6, 7, 8:
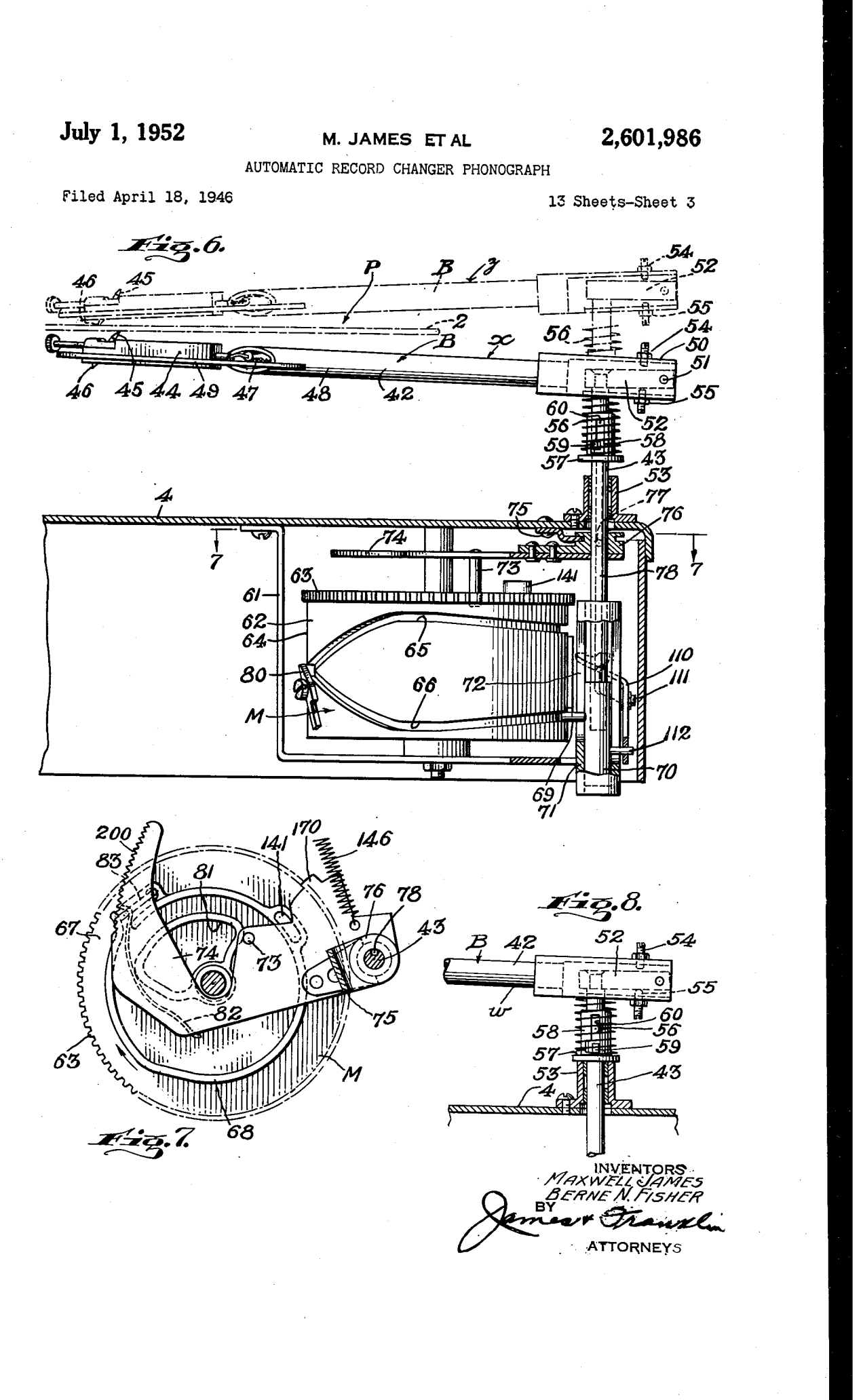

For imparting these movements to the tone arm, the support 43 therefor is vertically or axially movable between the lower and upper positions illustrated in Figs. 6 and 10 of the drawings, and is rotated horizontally about the axis of the support between the extreme positions shown in Fig. 11 of the drawings. The tone arm 42 and its mounting or support 43 are preferably so designed that for top side playing the tone arm is weight-loaded and for bottom side playing it is spring-loaded. This construction affords the right degree of pressure to be exerted on the stylus for playing both of the opposite sides of the record. To accomplish these desired ends, the tone arm 42 is pivotally mounted as aforesaid by means of the pivot 51 on the supporting bar 52 between limits, the said limits being defined by the two stop members (adjustable) 54 and 55 mounted on the box part 50 of the tone arm in positions to engage or to be engaged by the support bar 52. Surrounding the rod support 43 is a compression spring 56 the upper end of which is adapted to engage the tone arm box part 50 and the lower end of which is adapted to engage a flange 57 of a collar 58, the collar being axially and rotatably movable on the rod support 43. The rod support is also provided with a pin 59 which mates with an L-shaped slot 60 formed in the collar.

With this construction the following functions are accomplished:—for bottom side playing, the spring 56 is effective for spring-loading the tone arm and for top side playing the weight of the tone arm is utilized for weight-loading the same. The weight-load and spring-load may be readily determined so that the proper engagement pressure between the stylus and the record is secured for both the bottom side playing and the top side playing of the record. The collar 58 so functions that it not only provides a bearing and holder for the spring 56, but it is movable away from fixed parts of the machine during the playing of the bottom side of the record so as to eliminate any resisting friction that would be otherwise due to the same.

The operation of this recited mechanism may be more fully seen by following through a sequence of movement of the tone arm. When the tone arm is in the position w—a the tone arm support 43 is in the position shown in Fig. 8 with the flange of the collar 58 in engagement with the stationary bearing 53 and the spring 56 in compressed condition. The tone arm 42 is thereby moved to the position shown in Fig. 8, the stop 55 being in engagement with the bottom side of the support bar 52, this being one of the limiting positions of the tone arms. During the initial rotation of the support 43, the pin 59 moves horizontally in the wide part of the slot 60 and thereafter the collar 58 is rotated until the tone arm assumes the position w—b (or w—c). The support 43 is then lifted for moving the tone arm into bottom side record engagement and thus to the position x—b or x—c, the position shown in Fig. 6 of the drawings. The collar 58 has thereby been lifted to disengage the bearing 53 and the spring 56 in compressed condition exerts the degree of pressure necessary to spring-load the tone arm. The tone arm, however, has been depressed against the action of the spring away from its w position, thereby relieving the tone arm from the stop 55 and permitting the degree of vertical pivotal movement of the tone arm on its support necessary for a playing operation. In the continued operation of the machine the reverse movements of the parts just described will take place up to the point that the tone arm reassumes the position w—a. The support 43 is thereupon axially moved to the position y—a depicted in Fig. 9 of the drawings. In moving to this position, the collar 58 drops to the position shown in Fig. 9, thereby releasing the spring 56 from the tone arm and permitting the weight alone of the tone arm to become active. In this position the top stop 54 of the tone arm box 50 engages the top side of the support bar 52 as shown in Fig. 9, this being the other limiting position of the tone arm. The tone arm is then moved into the position y—b or y—c and thereupon into initial playing engagement with the record to the position z—b or z—c. When moved to the last mentioned position, the stop 54 is lifted free from the bar 52 (see dot-dash line position in Fig. 6), and the tone arm is thereupon permitted the free vertical movement about its axis necessary or desirable during the playing of the record. The reversing of these latter mentioned operations takes place when the tone arm at the end of the playing of the top side of the record is lifted from the record, swung outwardly, and then moved to a position for bottom side playing.

*Tone arm operating mechanism*

The mechanism for operating the tone arm through the described sequence of operations may be described by reference to Figs. 6, 7, 10, 11, 12 to 18, and 23. This mechanism comprises a main cam M suspendedly mounted for cyclic rotation from the phonograph platform 4 in the bracket 61 provided with cam parts connected through the medium of cam followers for operating the tone arm support or mount 43.

The cam M in the embodiment shown comprises a cylindrical or drum-shaped member 62 peripherally formed with an operating gear 63, the cylindrical side wall 64 of which is provided or formed with a first cam part 65 for operating the tone arm for top side playing and a second cam part 66 for operating the tone arm for bottom side playing, and another, as, for example, the top wall 67 which is provided or formed with a third cam part 68 for swinging the tone arm to and from playing relation with the record. The cam parts 65 and 66 each preferably comprises an annular cam track. The cam part 68 is of a compound nature best depicted in Fig. 7 of the drawings. Coacting with the cam tracks 65 and 66, is a cam follower device comprising in the embodiment shown a cam pin 69 fixed to a plunger 70 vertically movable in a cylindrical pot 71. The cylindrical pot is longitudinally slotted at 72 and this in conjunction with the follower pin 69 constrains the plunger 70 for vertical movement in the pot. The tone arm rod support 43 is rotatably fitted at its bottom end in the plunger 70 so that the rod support 43 is vertically movable with but is rotatable in the plunger 70. Mating with the cam track 68 is another cam follower device comprising a cam pin 73 secured to a sweep arm 74, the said sweep arm being suspended from the platform 4 by means of the fork 75, the sweep arm being rotatable in said fork and about the axis of the rod support 43. The attaching bearing 76 of the sweep lever is provided with a pin 77 (Fig. 6) which projects into a longitudinal groove 78 formed in the rod support 43.

The annular cam tracks 65 and 66 are best shown in the development of the cam side wall depicted in Fig. 23. These cam tracks are shaped as here shown comprising annular cam grooves provided with a cross-interconnection 79. This cross-interconnection forms part of a means for causing the cam follower 69 to coact first with one cam part or track 65 and then with the other cam part or track 66 for effecting successive playing of opposite sides of the record. At this cross-connection 79 there is provided a mechanical switch device or frog 80 which is controlled for directing a cam follower from one to the other of the cam tracks for accomplishing a number of purposes to be described.

The compound cam track 68 and its cooperation with the sweep lever 74 are in themselves known and are shown and described, for example, in the copending application of Kenneth R. Bender Serial No. 565,588, now Patent No. 2,545,643, for Record Changer Phonograph, filed November 29, 1944. In a cycle of rotation of the cam M, the sweep arm 74 beginning with its tripping position shown in Fig. 7 is swept outwardly by the engagement of the cam follower pin 73 with the inner cam rib 81 and is moved thereby into the space between this cam rib and the cam track 68. Further rotation of the cam then causes the follower to be engaged by a leaf spring 82 anchored at 83 in the top wall of the main cam for moving the sweep lever inwardly to an initial playing position for large or small size records, the latter position being determined by other mechanism to be described. The outward and inward swinging movements of the sweep arm 74 are transmitted by the elements 76, 77 and 78 and the support or mount 43 of the tone arm to corresponding outward and inward swinging movements of the tone arm.

The movement of the cam follower pin 69 in the annular cam track 65 and 66 and the cross-interconnection 79 determine the bodily vertical movement of the tone arm B as above described, the vertical movement of the follower pin 69 being translated into the corresponding vertical movement of the tone arm support rod 43 by the means comprising the plunger 70 and its connection to the rod 43. It will be observed that the rotation of the rod in the plunger enables the rod to be also rotated by the sweep arm for accomplishing the in and out sweeping or shifting movement of the tone arm.

The stationary or home position of the main cam M is that shown in Fig. 6 of the drawings. Figs. 13 to 18 show this main cam in various phases of its operation for moving the cam follower pin 69 and consequently the tone arm and its support vertically through various positions for top and bottom side playing of the record. By reference to these figures and the development view of Fig. 23, the complete sequence of operation for top and bottom side playing may be described.

It will be assumed for a starting point that the tone arm has been located at its initial playing position for bottom side of the record. This is the position shown in Fig. 6, the cam M being stationary. The record is played and the sweep lever then assumes the position shown in Fig. 7. When the terminal record groove is reached, the machine is tripped and the operation of the cam M is initiated. The cam is rotated for a complete cycle or revolution in the direction indicated by the arrows in Fig. 7, Figs. 13 to 18, and Fig. 23.

The vertical movements imparted to the cam follower 69 and consequently to the tone arm for successive cycles for the playing of both sides of the record may be traced by reference to the cam development shown in Fig. 23 of the drawings. The cam follower 69 is in its starting position in the bottom cam track 66. In the first cycle of rotation of the cam, the cam follower 69 will move through the track section $e$ of the lower cam track 66 for causing the movement of the tone arm from its $x$ position to its $w$ position (Figs. 6 and 10). When the cam follower moves through the track section $f$, this position is held and it is during this period that the tone arm is swung outwardly to its $a$ position. In the continued rotation of the cam, the cam follower is constrained to move through the track sections $g$ and $h$ past the cross-connection 79 and thereby the tone arm is lifted to its $y$ position (Fig. 10). As the cam continues its rotation, the cam follower moves through the cam track section $g'$ and thus the $y$ position of the tone arm is maintained; it is during this period that the tone arm is moved from its $a$ position to its initial playing position $b$ or $c$. As the cam furthers its rotation, the cam follower moves in the cam track section $h'$ and thereby the tone arm is moved from its $y$ position to its $z$ or playing position. During the playing position, the cam follower is located in the cam track section $i$. In moving from the track section $g$ to the track section $h$, the switch or frog 80 becomes operative in a manner to be later described. The top side of the record is then played until the position of the tone arm for top side playing also illustrated in Fig. 7 is reached. The machine is again tripped and the cam M again set into rotation for a cyclic operation. As the follower now moves through the cam track section $j$ of the upper cam track 65, the tone arm is lifted from its $z$ position to its $y$ position. In the continued rotation of the cam, the cam follower moves through the cam track section $k$ to maintain the $y$ position of the tone arm; it is during this period that the tone arm is swung outwardly from its $d$ position to its $a$ position (Fig. 11). As the cam continues its rotation, the cam follower is constrained to move downwardly through the track sections $l$ and $m$ past the cross-connection 79 and into the lower cam track 66. During this motion the tone arm is moved from its $y$ position to its $w$ position while it is held in its outward or $a$ position. In the continued rotation of the cam, the cam follower then moves through the cam track section $n$, during which time the tone arm is held in its $w$ position; during this period the tone arm is moved inwardly to its initial playing position $b$ or $c$ for bottom side record playing. In the further rotation of the cam, the cam follower moves through the cam track section $o$ and thereby moves the tone arm from its $w$ to its $x$ position, and, therefore, into playing engagement with the record on its underneath side. The rotation of the cam stops for the cam follower in the cam groove section $p$ at which time the bottom side of the record is being played. When the end of the playing of this side of the record is reached, the first of the two cycles described is repeated.

The cross-connection 79 determines the movement of the cam follower from either annular cam track to the other. The mechanical switch or frog 80 is provided for effecting the positive guiding movement of the cam follower from one cam track to the other. The frog or switch comprises a lever pivoted at 84 on the cam M at the track intersection, the said lever having an arm 85 which extends normally across the second cam track 66 being stopped in this position by a pin 86 and being urged to this position by a spring 87 active on the other arm 88 of the frog or switch lever. Normally then the frog assumes the position shown in Figs. 13 and 23. When in a cyclic rotation of the cam M, the cam follower moves from the bottom cam track through the track section g, the cam follower engages the protruding arm of the frog and moves the latter to the position shown in Fig. 14 of the drawings, the cam follower 69 being thereby compelled to track over the cam track m and to move into the cam track h, and, therefore, into the upper cam track 65. On the next cycle of operation, when the cam follower 69 is moving downwardly from the top cam track and through the cam section l, the gravity of the parts will cause the cam follower to move into the track section m and this movement takes place over the top edge of the frog 80 as indicated sequentially in Figs. 15 and 16 of the drawings. Thus for this operation, the frog or switch remains in its normal and unmoved position. In the next cycle of the cam, the switch again guides the return movement of the cam follower from the lower or second cam track 66 to the upper or first cam track 65, in the manner described. Sequential movement through bottom and top side playing of the records, is, therefore, assured.

The frog or switch 80 is also utilized to accomplish another important function in a simple way. When it is desired to operate the phonograph for the playing of only one side of a supply of records, such, for example, as the top side, the frog or switch 80 is operated during each cycle of rotation of the cam just in advance of the cam follower 69 reaching the intersection, and thereby the cam follower 69 is prevented from entering the second or bottom cam track and is constrained to move only through the first or top cam track so that the tone arm is operated for successive cam cycles only to its upper position, and, therefore, only for top side playing. This is accomplished by a simple angle lever 89 pivoted on the framework at 90 (see Fig. 18), normally occupying the out of the way dot-and-dash line position shown in Fig. 18, which lever, when moved into its full line position shown in Fig. 18, interposes its angle arm 91 in the path of movement of the frog 80 on the cam. The angle lever 89 is positioned with reference to the cam follower 69 as depicted in Fig. 17 of the drawings. Consequently, as shown in Figs. 17 and 18 of the drawings, when the angle lever is moved to its full line position, it engages the frog 80 when the cam is rotated to the position shown in Fig. 17, thereby moving the frog or switch to its lower track closing position shown in Fig. 17 and then upon the next incremental movement of the cam, the cam follower 69 is caused to move from the track section l to the track section h and thus from the first or upper track 65 back to the upper track 65. This operation takes place during each cycle of the cam so long as the angle lever 89 is in the full line position. Therefore, during each cycle of the cam under this condition, the upper or first cam track only is operative and, therefore, the machine will be conditioned for top side playing only of a supply of records. The angle lever 89 may be operated by a simple manual control linkage.

*Record rotating mechanism*

The record 2 at the playing station P is rotated in one direction for bottom side playing and in the reverse direction for top side playing. The record rotating mechanism C for accomplishing this operation may be described by reference to Figs. 1 to 5 and 12 of the drawings.

As shown in Fig. 1 of the drawings, the record rotating mechanism C is operated in the indicated arrowed direction for rotating the record 2 counterclockwise (viewed from the top) for bottom side playing, and as shown in Fig. 2, this mechanism is operated in the arrowed direction indicated in this figure for rotating the record 2 clockwise for top side playing. While the record rotating mechanism might be embodied in means separate from the record supporting means D, in the construction exemplified, this record rotating mechanism is embodied in the record supporting means.

Referring now to Fig. 5 of the drawings, this mechanism C comprises a conical friction wheel 92 constantly rotating during the operation of the machine in the counter-clockwise direction indicated in Fig. 5, by being fixed or keyed to the enlarged portion 93 of the shaft of an electric motor 94, the latter resiliently suspended from the phonograph platform 4 in the manner clearly shown in Fig. 5. The record engaging wheel 26, which may be a rubber wheel, is fitted to a rotatable bearing 95 which is connected to another rotatable bearing 96 by means of a flexible shaft 97, the said bearings being mounted for rotation in the opposite ends of the support arm 25. The bearing 95 and its wheel 26 are preferably at a slight angle to the supporting arm 25. Housed within the support member 23 is a transversely movable clutch member comprising a slidable shaft 98 having a sleeve 99 pinned thereto, the said sleeve carrying the friction wheels (rubber faced) 100 and 101. The shaft 98 is splined to the rotatable bearing 96 so as to be rotatable therewith but slidably movable relative thereto. The friction wheels 100 and 101 are arranged on opposite sides of the friction driving wheel 92, which latter and the motor 94 are located in the axis of rotation of the supporting means D.

For operating the clutch, there is provided an angle lever 102 fulcrumed at 103 on a bracket 104 fixed to the support 23, the lower arms 105 of the lever being forked for engagement with the pin or rod 106 on the shaft 98 and the opposite arm 107 of the lever being engaged with or engageable between two disc elements 108 formed at the top of a vertically movable operating rod 109.

The record rotating mechanism C is coordinated in its operation with the position assumed by the tone arm B. Thus when the tone arm B is moved in position for bottom side playing, the record rotating mechanism C is operated in one direction as depicted in Fig. 1, and when the tone arm is moved into position for top side playing, the said mechanism C is operated in the reverse direction. This is accomplished by connecting the operating rod 109 to the same means which operates the tone arm. Referring now to Fig. 12 of the drawings, the rod 109 is connected by means of the lever 110 fulcrumed at 111 to the cam follower means actuated by the main cam M. Extending through plunger 70 which carries the cam follower 69, is a pin 112 which is engaged by the slotted end 113 of the lever 110.

The other end 114 of this lever is adapted to engage either the collar 115 or the collar 116 mounted on the operating rod 109. To permit an over-travel of the lever with reference to the rod 109, these collars are connected by means of springs to the rod; and thus the collar 115 is connected to the rod by means of the fixed collar 117 and the interposed spring 118 and the collar 116 is connected to the rod by means of the fixed collar 119 and the interposed spring 120. A spring 121 surrounding the upper end of the operating rod 109 and a spring 122 active on the angle lever 102 serve to bring these parts in balance at their neutral positions to be described.

The operation of this record rotating mechanism and its relation to the mechanism for positioning the tone arm when the parts are connected as shown in Figs. 5 and 12 may now be described, such parts being connected as shown during all operations of the main cam M except during that part of the cycle of movement thereof when the tone arm is being moved from the upper cam track 65 to the lower cam track 66. In Fig. 3 the parts of the mechanism C are in engagement for top side playing. In Fig. 12 they are in engagement for bottom side playing, and in Fig. 5 the parts are in a neutral position. In Fig. 12 the cam M is rotating and is about to reach the end of its operating cycle. When in a neutral position (Fig. 5) both clutch friction wheels 100 and 101 are disengaged from the driving wheel 92 and thus the record engaging driving wheel 26 is stationary. When the cam follower 69 is in the bottom cam track 66 (with the cam stationary or movable), the lever 110 is operated to or is in a position corresponding to that shown in Fig. 12 in which case the rod 109 is elevated to cause the angle lever 102 to be operated to the position shown in Fig. 12 for moving the clutch wheels outwardly transversely and thereby causing the driving wheel 92 to be engaged by the friction wheel 100 for rotating the record engaging wheel 26 for bottom side playing. When the cam follower 69 is in or moving through the top cam track 65, the lever 110 will be moved to or assume the opposite position of its oscillation with this lever moving the operating rod 109 downwardly so as to cause the other friction wheel 101 to become engaged by the driving wheel 92, in which event the driven wheel 26 is rotated for top side playing of the record.

When the supporting means D is oscillated from record supporting position, the angle lever 102 and the clutch and the disc elements 108 of the operating rod become disengaged and when the supporting means D is returned to the record intercepting and supporting position, these elements become re-engaged. This disengagement and re-engagement takes place only when the shift is from top side playing to bottom side playing (i. e. between successive records), and, therefore, takes place only when the cam follower 69 moves from the cam track $l$ to the cam track $m$. Disengagement between the angle lever 102 and the rod 109 takes place at the beginning of the operating cycle of the cam M (see Fig. 32), and re-engagement takes place in the region immediately beyond the 180 degree position of the cam or substantially at the 190 degree position (see Fig. 32). The cross-intersection 79 of the cam is at this position (see Fig. 23) and it is at this position that the lever 110 moves the operating rod 109 to a position corresponding to the neutral position of the clutch members as shown in Fig. 5. The disc elements 108 of the operating rod are at this time in the position for being re-engaged by the arm 107 of the angle lever 102 as the supporting means D is rotated into its final or home position.

We have found that a single driving means is adequate for driving a record at the playing station in either of its opposite directions, whether the tone arm engages the record from the top or from the bottom. A single driving mechanism is thus provided. The other supporting means D' and D² may thus constitute idler or free wheels. Referring then to Fig. 4 of the drawings, the record supporting wheel 31 which may be a rubber edged wheel is attached to a shaft 123 freely mounted in bearings as shown in the transversely extending arm 30 of the supporting means D' (or D²). This shaft as well as the arm 30 is also slightly inclined upwardly to correspond to the inclination of the driving wheel 26. With the drivng wheels peripherally faced as shown, an efficient and uniform driving contact is obtained.

Only a single record is supported for a playing operation at the playing station. The driving mechanism is, therefore, called upon at all times to drive only a single record with the result that uniform operating speeds are always attained, all other loads on the driving mechanism being eliminated. A low inertia driving means is also thereby achieved.

*Mechanism relating the record playing means with the record feeding means*

The record playing means is automatically operated for each side of the record and the record feeding means is automatically operated only after both sides of the record have been played, except where the machine is set for one side playing only. Mechanism is, therefore, provided for operating the tone arm for every successive cycle change and for operating the record feeding means with a skip cycle, i. e., in alternate cycles. This mechanism for accomplishing both functions inter-relatedly is preferably embodied in the main cam M; and this mechanism may be described by reference to Figs. 26 to 30, 23 and 32.

As shown in Fig. 32, the record feeding mechanism operated by the levers 17 and 35 are operated by the responsive movement of the cam follower 20. This cam follower shown here in its home or stop position mates with a cam track 124 formed in a disc-shaped cam 125. This disc-shaped cam 125 (see now Figs. 26 to 30) is rotatably mounted within and at the bottom of the cylindrical wall 62 of the main cam M and is fitted to a sleeve 126 journalled in an inner sleeve 127 the latter fixed to the top wall 67 of the main cam. The cylindrical cam 62 thus comprises a first cam member and the disc cam 125 comprises a second cam member rotatable within the first cam member.

The cam track 124 comprising a channel defined by an inner rib and an outer wall as best shown in Fig. 27, is contoured as best shown in Figs. 26 and 32 to provide a rising cam section 128, a dropping cam section 129 and a substantially concentric section 130, these sections functioning respectively for causing the forward stroke of the levers 17 and 35, the return stroke of these levers and the dwell position of these levers all during a cycle of rotation of the disc cam member 124, which, when rotated, moves in the arrowed direction shown in the figures. A cycle of rotation of the disc cam member 124, therefore, produces the operation of both record feeding means above described and thus a drop-feed of a record at the playing station to the receiving station and a drop-feed of a record from the supply station to the playing station.

The cam members 62 and 124 are adapted to be connected and disconnected by the following mating means: the cam member 125 is provided with an inwardly directed lug 131 and the cam member 62 is provided with a vertically movable slide 132 having a pin 133 which projects inwardly through a slot 134 in the cylindrical wall of the cam, the projecting pin being adapted to engage and be disengaged from the lug 131 as best shown in Figs. 28 and 29. The slide 132 terminates at its bottom in an inclined surface 135. The height of the slide 132 is such that it is movable with reference to the contiguous sections of the cam tracks 65 and 66 between the position shown in Fig. 28 and the position shown in Fig. 29. In the dropped position shown in Fig. 28, the inclined face 135 is adapted to be engaged by the cam follower 69 when the latter is moving through the cam track section $p$ of the lower cam track 66 as shown in Fig. 29. When the cam follower 69 moves through the section $i$ of the upper cam track 65, the position of the slide 132 remains unaltered. The slide 132 is mounted on the cylindrical member of the main cam in the position best shown in Fig. 23.

With this construction it will now be evident that when the cam follower 69 located in the section $p$ of the lower cam track (during bottom side playing) is then moved by the next cycle of rotation of the main cam to the upper cam track for top side playing of the record and thus to the section $i$ of the upper cam track, the rotation of the cam in the arrowed direction will cause the cam follower 69 to raise the slide 132 from the position shown in Fig. 28 to that shown in Fig. 29 and thus cause the slide pin 133 to move over the lug 131 in the manner depicted in Fig. 29 of the drawings. Therefore, the cylindrical cam member 62 alone is rotated and the disc member 124 is held stationary by the load active thereon. Consequently, the tone arm will be moved from bottom side playing to top side playing and the record feeding means will remain inoperative or stationary. The slide 132 when removed from the sphere of action of the follower 69 gravitates to its Fig. 28 position so that at the end of this described cycle of movement, the parts will assume the position shown in Fig. 28.

On the next cycle of operation, when the cam follower 69 is moved from the top cam track to the bottom cam track and thus from the track section $i$ to the track section $p$, the slide 132 will not be engaged thereby and, consequently, the pin 133 of the slide engaging the lug 131 (see Fig. 28) will cause the disc cam member 125 to rotate in unison with the cylindrical cam member 62. Therefore, during this cycle when changing from top side playing (of one record) to bottom side playing (of the next record), the record feeding means will be operated. Where the machine is set for top side playing only, the cam follower 69 will move only in the top cam track 65 and, therefore, the condition depicted in Fig. 28 will obtain at all times and, consequently, the record feeding means will be operated during every cycle of rotation of the main cam along with the record playing means.

*Controlling mechanism for determining tone arm position*

The record changer is adapted for playing intermixed different sized records such as 10 and 12 inch records. Mechanism is, therefore, provided for automatically determining the setting of the initial playing position of the tone arm means B to conform to the particular size of a record fed to the playing station. Automatic means is also provided for shutting off the operating motor after the last record of the supply has been played. The record at the playing station, whether it be a 10 inch record or a 12 inch record, is played, however, successively on both of its opposite sides; and, therefore, the mechanism for determining the tone arm positions, that is to say, the means for determining the setting of the initial playing position of the tone arm as well as the means for shutting off the motor after the last record has been played, is so designed that it will come into operation only after the record has been played on both of its opposite sides.

The combination employing both of these automatic means may be best described by reference to Figs. 1 and 2 and 34 to 40 of the drawings. Referring first to Figs. 1, 2 and 34, intermixed different sized records 1 are shown at the supply station S, a record 2 of the smaller or 10 inch size is shown at the playing station P in Fig. 34, a stack of records 3 is shown at the record receiving station R.

The sweep or swinging movements of the tone arm B are produced by the swinging movements imparted to the sweep lever 74 which is keyed to the tone arm support 43, this lever being provided with the cam follower 73 which also serves as the element engaged by the stop means of the automatic mechanism involved. Referring now to Figs. 39 and 40, the operated or controlled parts of this automatic mechanism comprises a stop lever 136 suspendedly supported in the platform 4 and fulcrumed as at 137, and a control lever 138 similarly supported and fulcrumed at 139. The stop lever 136 is spring-loaded for movement in one direction by the spring 140 and is operated for movement in the opposite direction by a lug 141 formed on the main cam M at its top wall. In Fig. 39 this lug is in the cam stop position and in Fig. 40 the lug is shown moving in the arrowed direction and is in a position close to the end of the cam cycle. The stop lever 136 is provided with a flange 142 in one of its arms for cooperation with this lug 141, and is formed in the other of its arms with three stop elements in the form of teeth designated 10', 12' and $s'$, representing, respectively, the 10 inch, 12 inch and motor shut-off stop positions.

The control lever 138 comprises a reversely bent lever spring-loaded at its fulcrum by a spring 143, one bent arm of the lever 144 serving as a stop means for engaging the underneath of the platform 4 (see Fig. 34) and the other bent arm 145 of the lever being formed with toothed surfaces designated as $10^2$, $12^2$ and $s^2$, representing the control stops for the 10 inch, 12 inch and motor shut-off record positions. These control stops cooperate with an edge of the stop lever 136.

The control lever 138 is adapted to be moved into three different positions indicated in Figs. 34, 35 and 36, respectively. In Fig. 34, the control stop $10^2$ is engaged by the stop lever 136, in Fig. 35 the control stop $12^2$ is engaged by the stop lever 136, and in Fig. 36 the control stop $s^2$ is so positioned as to permit the lever 136 to move under the control lever 138 so as to determine respectively the 10 inch, the 12 inch and the motor shut-off positions of the stop lever 136.

During a cycle of operation of the main cam M, the sweep lever 74 is moved from the dash-and-dot line position $d$ to the full-line position $a$ depicted in Fig. 39 and then to a position determined by the stop lever 136, Fig. 40 showing the stop lever determining the position of the sweep lever for a 12 inch record and, therefore, for its $b$ position. At the beginning of the cam cycle, the stop lever 136 is positioned as shown in Fig. 39. During the initial movement of the cam cycle, the lug 141 of the cam moves counter-clockwise as viewed in Fig. 39, and as soon as this lug passes the stop lever flange 142, the lever is released and is actuated by its spring 140 for cooperation or engagement with the control stops of the control lever 138. In Fig. 40 the stop lever 136 is shown in engagement with the 12 inch control stop of the control lever. During the continued cycle of rotation of the main cam, the sweep lever 74 is swung outwardly to its stop or $a$ position, and when swung inwardly by the main cam, lightly assisted by the spring 146, the follower pin 73 engages the 12 inch stop of the stop lever and thereby the tone arm is located at its initial playing position for a 12 inch record. At the end of the cam cycle, the lug 141 engages the stop lever flange 142 (this shown about to engage in Fig. 40), and the final increment of movement of the cam in moving the lug to the position shown in Fig. 39 moves the stop lever 136 from its stop determining position shown in Fig. 40 to its sweep lever release position shown in Fig. 39, thus permitting the sweep lever to move inwardly during a tone arm playing operation.

For a 10 inch record, the stop lever 136 is engaged by the control lever 138 as depicted in Fig. 34, and under this condition the sweep lever 74 will be engaged by the stop tooth 10' of the stop lever, thereby positioning the sweep arm and its tone arm in the initial playing position for a 10 inch record. Fig. 35 depicts the engagement between the stop lever and the control lever for the cycle of operation above described in connection with Fig. 40. When the control lever 138 is moved to the position shown in Fig. 36, the stop lever 136 is freed to move underneath the control stop surface $s^2$, and under this condition the stop lever 136 will assume the dot-and-dash line position shown in Fig. 40, at which time its stop $s'$ will be engaged by the sweep arm follower pin 73 to determine or locate the sweep lever and its tone arm in the $a$ or stop position shown in dot-and-dash line in Fig. 40 of the drawings.

These operated parts of this automatic mechanism are actuated by devices set into operation by the records, the operation of which, however, is rendered effective only after both sides of a record have been played. This functioning is carried out for the positioning of the tone arm for 10 and 12 inch records as well as for bringing the machine to a stop after the last record, 10 or 12 inch, has been played.

For determining the setting of the tone arm to conform to the particular size of a record fed to the playing station, there is provided a device 147 interposed in the path of feeding movement of a 12 inch record (see Fig. 34) so as to be operated by the 12 inch record, said device when so operated being connected to operate the control lever 138 by means of the rods 148 and 149 supported for vertical movement in a bracket generally indicated as 150, the rods having interposed therebetween a spring 151, a second spring 152 being active for returning the rod 149 to its upper or normal position. These parts are normally held by the springs 151 and 152 in the position shown in Fig. 34. When a 12 inch record is dropped from the supply station to the playing station as depicted in Fig. 35, the device or feeler 147 is displaced and, therefore, actuated thereby to move the rods 148 and 149 to the position shown in Fig. 35 for moving the control lever 138 to the position shown in this figure. In the cycle of which the feeding of this record forms a part, the tone arm is thereby positioned for initial engagement with a 12 inch record. When a 10 inch record is dropped to the playing station as indicated in Fig. 34, the feeler device 147 is not actuated and, therefore, the control lever 138 remains in its normal (operated by a spring 143) position shown in Fig. 34, in which event the tone arm is positioned for initial engagement with a 10 inch record.

The operation of the feeler device 147 and the rods 148 and 149 is, however, momentary only, these parts being spring-returned to their normal position (Fig. 34) as soon as a 12 inch record has been fed to the playing station. Since it is desired to maintain or retain the determining position of the control lever for both of the opposite sides of the record which has been fed, means are employed for holding the control member in its determining position for the setting of the tone arm for the playing of first one side and then the other side of the record, and means are further employed for returning the control member to its normal position after the tone arm has thus been set for the playing of both sides of the record.

To accomplish these last recited purposes, there is provided a lever 153 fulcrumed on the platform 4 at 154 and spring-loaded by the spring 155, the said lever having an arm 156 which mates with the up-turned stop end 144 of the control lever 138 in the following manner: when the stop lever is in its normal 10 inch position shown in Fig. 34, the arm 156 of the lever 153 engages the stop end 144 of the control lever as shown in Fig. 34, and when the stop lever is moved to the position shown in Fig. 35, this arm 156 is spring-urged to the position shown in Fig. 35 above the stop end 144 thereby forming means for holding the control lever 138 in this position. Fig. 39 shows the position of the arm 156 corresponding to that of Fig. 34, and Fig. 40 shows the position of the arm corresponding to that of Fig. 35. Therefore, when the control lever 138 is momentarily actuated to its Fig. 35 position by a 12 inch record moving to the playing position, the control lever is held in this position by the lever 153.

The lever 153 is actuated after both sides of the playing of every record and, therefore, after both sides of a 12 inch record have been played, this lever being actuated from the full line to the dash-and-dot line positions shown in Fig. 40. This is accomplished by operating the lever 153 by an element of the record feeding means such as by the collar 24 of the supporting means D. This collar is provided with a lug 157 so positioned that when the record supporting means D is oscillated toward the end of its record releasing stroke, the lug 157 engages the free arm of the lever 153 to move the same from the full line position to the dash-dotted line position shown in Fig. 40. Thus it is when a record has been played on its opposite sides and is drop-fed to the record receiving station, that the control lever 138 is returned to its normal 10 inch position. A new record is drop-fed to the playing station at the end of the return oscillating stroke of the supporting means D, and, therefore, the control lever 138 has been made ready for another tone arm determining operation.

The means for determining the stop operation of the machine comprises a record follower 158 rotatably mounted on a rod 159 which is vertically movable in the spaced bearings 160 and 161 under the influence of a spring 162 anchored between a collar 163 and the bearing 160, the follower 158 bearing or resting upon the top record of the record stack 1 (Fig. 34). A second spring 164 is provided active as shown in Fig. 36 between the collar 163 and the lower rod bearing 161. The record follower rod 159 is designed to operate the control lever 138 to the stop position shown in Fig. 36 by the engagement of the lower end of the rod with an adjustable screw 165 provided in the control lever 138. The parts are so dimensioned and designated that when, as shown in the dot-and-dash line positions of Fig. 34, the record follower 158 is released by the drop-feeding of the last supply record 1 to the playing station, the rod will be in a condition to be moved by its spring to a position for operating the control lever 138 to its stop determining position shown in Fig. 36.

However, it is desired to make effective this stop operation only after both sides of the record which has been fed to the playing station have been played. This is accomplished by interposing in the path of movement of the rod 159 an element for restraining the rod from becoming effective, which element is removed as a restraining means only after both sides of the record have been played. In the embodiment of the present invention, two such elements are utilized, one in the form of a finger piece 166 extending from the lever arm 156, and the other in the form of a lever 167 fulcrumed at 168 and having in one of its arms a spring controlled pawl 169 which is adapted to be engaged by a tooth 170 formed in the sweep lever 74. The finger piece 166 and the arm 171 of the lever 167 are adapted to cover an opening 172 through which the rod 159 is movable. Fig. 34 shows the opening closed by both the finger 166 and the lever arm 171, so as to form restraining means for the downward movement of the rod 159, and Fig. 36 shows this opening uncovered to permit the rod to be projected downwardly for operation of the control lever to its stop position. The levers normally occupy positions for closing the opening, so that when the last record of the stack has been fed to the playing station, the rod 159 is restrained from making its operation effective. The lever 167 is moved for clearing the opening when the sweep lever 74 is moved during each cycle from its d position to its a position, at which time the tooth 170 engages the pawl 169 for accomplishing this operation. The opening 172, however, remains covered by the finger piece 166 until the lever 153 is operated by the movement of the record supporting means D as already described. Thus when the last record fed to the playing station has been played on both of its sides, the drop-feeding of the played record to the record receiving station causes the lever 153 to be moved from its full line position shown in Fig. 40 to its dot-and-dash line position shown, thereby uncovering the opening 172. When this happens, the rod 159 completes its hitherto restrained movement and operates the control lever 138 to its stop position. When so operated, the stop lever 136 becomes effective by means to be described for shutting off the motor of the machine.

*The initiating or trip mechanism*

The initiating or trip mechanism functions to initiate or trip the main cam M for its operating cycle. The initiating mechanism is automatically set into operation when the tone arm reaches the end playing groove of a record, and may also be manually set into operation by the user actuating the reject button, later described, whenever the user desires a change of record or record playing. After the main cam has made its complete operating cycle, the initiating or trip mechanism is automatically restored, ready for the next tripping operation.

This initiating or trip mechanism may be described by reference to Figs. 19 to 22 of the drawings. This mechanism is substantially the same as that disclosed in the copending application of Kenneth R. Bender, Serial No. 565,588, filed November 29, 1944, for Record Changer Phonograph.

In Figs. 19 to 22, the relations between the sweep arm 74, stop lever 136 and control lever 138 just above described are also shown and in particular relation to the operation of the main cam M. The position and operation of the main cam M may be readily determined in these figures by following the position or movement of the lug 141 thereon. Fig. 19, therefore, shows the main cam in its home or stationary position, and Fig. 20 shows the cam in motion and at about 90 degrees from its home position. Fig. 19 also shows the position and arrangement of the parts after they have previously been moved to the phonograph stop position; in which position the tone arm and its sweep lever 74 is frictionally held out in the stop position; the switch (to be described) has just been manually turned to the position for playing a stack of records, and as soon as the switch is given the further movement (to be described), the parts as shown in Fig. 19 will be tripped and the machine will be set into operation. In Figs. 20 and 21, the operation of the main cam has been initiated, resulting in the release of the stop lever 136 (the same having moved from the position shown in Fig. 19 to the position shown in Fig. 20), and the cam follower 73 of the sweep lever 74 has been engaged by the cam track 81 and is being moved outwardly from its inside or d position.

In Fig. 19, the trip mechanism now to be described is in its restored condition, and in Figs. 20 and 21 is in its tripped condition for initiating and carrying out the operating cycle of the main cam.

This trip mechanism comprises a carrier lever 173 fulcrumed at 174 on the machine platform 4, and a trip lever 175 pivoted to and carried by the carrier lever at the pivot axis 176. The carrier lever is provided at one end with a bearing 177 to which is pivotally connected a link 178. A tension spring 179 is active on the outer arm 180 of the carrier lever. The trip lever 175 has a limited pivotal motion on the carrier lever, limited by the slot 181 in the former, receiving the pin 182 on the latter. A spring 183 connects the levers to normally move the trip lever 175 on the carrier lever to a position such as shown in Fig. 19. The trip lever also carries in one of its arms a trip screw 184 and is provided in the other of its arms with a spring reset pawl 185. The trip lever is also provided with a cam engaging lug 186 near its trip screw, which is positioned to cooperate with a small cam 187 fitted to the shaft 188 of the main cam M.

The parts assume the position shown in Fig. 19 at the final increment of movement of the main cam M. During this increment of movement, the small cam 187 at a projecting shoulder 189 engages and moves the trip lever lug 186, causing the trip lever to act as a drag bar. The trip lever thereby drags or pulls the carrier lever 173 about its fulcrum 174 and against the action of the spring 179 to move the link 178 in the direction of the arrow 190 in Fig. 19. In doing so, the spring 179 acting on the carrier lever is tensioned. As will be described presently, this movement which is translated to the described movement of the link 178 disengages the main cam from the operating motor and more particularly from a driving wheel 191 fixed to the bottom of the shaft of the motor 94, and thus terminates the rotation of the main cam and hence its operating cycle. The parts are then in position for one of the tripping operations.

Tripping is accomplished by an incremental movement of the trip lever 175. The trip lever may be given such movement in any of several ways. Inward movement of the tone arm B to the finishing groove of a record causes the sweep arm 74 to engage the trip screw 184 which lies in its path (see particularly Fig. 21), and then moves the trip lever about its pivot on the carrier lever, against the action of the spring 183, the movement being limited by the pin and slot 182, 181. The trip lever lug 186 is also thereby moved off the shoulder 189 of the cam 187 and onto the high point of the cam. The previously imposed drag on the trip lever is also thereby relieved, and the carrier lever 173 is thereby freed to move under the influence of the tensioned spring 179 to cause the link 178 to move in the direction depicted by the arrow 192 shown in Fig. 20. This movement of the link causes the motor wheel 191 to be engaged by means for driving the main cam M and the rotation of the main cam M is thereby begun. The spring 183 restores the trip lever to its normal position on the carrier lever, as permitted by the decline of the now rotating cam element 187 to its low point, the spring serving to keep the lug 186 in engagement with the cam face. The condition shown in Fig. 19 is finally reached towards the end of the cycle when the final increment of movement of the main cam above described then takes place.

The means for connecting and disconnecting the motor wheel 191 to and from the main cam M in these described operations may be described by reference to Figs. 5, 19, 20 and 32. Referring first to Fig. 5, the motor wheel 191 is shown affixed to the bottom of the shaft 93 of the motor 94 and is there shown in rotating engagement with a rubber faced wheel 193. In Fig. 32, all of the elements of the driving connection between the motor wheel 191 and the cam gear 63 are shown and the relative rotation indicated by arrows. When the cam is initiated and operated, the motor wheel 191 is engaged by the rubber faced or friction wheel 193 to the shaft 194 of which is fixed a pinion 195 which meshes with a gear 196 to the shaft 197 of which is fixed a pinion 198, which latter meshes with the main cam gear 63. The shafts 194 and 197 are connected by the linkage element 199 so that the shaft 194 (and the pinion 195 and friction wheel 193 thereon) are also movable about the axis of the shaft 197 into and out of engagement with the motor wheel 191. The link 178 is connected to the linkage element 199 intermediate the ends thereof.

With this construction, having reference now to Figs. 19 and 20, it will be seen that when the initiating mechanism is moved to its restored position shown in Fig. 19, the linkage element 199 is moved about the shaft 197 as an axis so as to disengage the friction wheel 193 from the constantly rotating motor wheel 191; thereby the connection between the motor and the main cam is broken and the cam stops, and that when the initiating mechanism is tripped as depicted in Fig. 20, the linkage element 199 will be moved by the link 178 about the shaft 197 as an axis to cause the friction wheel 193 to become engaged with the motor wheel 191 and thereby the main cam is connected to the motor wheel and operated thereby for the full cam cycle.

The tripping mechanism resulting in these described operations may also be set into operation either manually or by the reset trip pawl 185. The manual trip operation will be later described. The re-set trip pawl is employed when records are used having eccentric finishing grooves which set the tone arm oscillating at the finish of a record. For this purpose the spring re-set trip pawl 185 is employed, and the sweep lever 74 is shaped to provide a serrated part 200 for engaging the same when the tone arm reaches a record eccentric finishing groove (see particularly Fig. 22). The oscillation of the sweep lever causes tripping movement of the trip lever about its pivotal mounting on the carrier lever.

Switch mechanism and its operation; the manual controls

The machine is controlled by a switch mechanism which is constructed to be automatically moved to the motor shut-off position when the last record of a record supply has been played. The switch mechanism is also so designed and constructed as to serve the additional purpose of manually tripping the machine both for the first initiating operation and for a reject operation (rejecting an unwanted record or a playing side thereof).

This switch mechanism, its control, and the parts operated thereby may be described by reference to Figs. 41 to 45, taken preferably in conjunction with Figs. 3, 19 and 33. The switch mechanism comprises a mercury switch element 201 fitted to a holder 202 which is fixed to an oscillatable rod 203 journalled in the brackets 204 and 205, one end of the rod terminating in a bent arm 206 and the other end of the rod being connected to a crank arm 207 which connects by means of a link 208 to an operating lever 209 spring-loaded as at 210 for return, the top arm 211 of the lever comprising one of the manual controls the same extending to and above the platform 4 as best shown in Figs. 3 and 33 of the drawings. This operating lever is fulcrumed on a shaft 212 in the supporting bracket 213. Manual movement of the lever arm 211 to the position shown in Figs. 3 and 33 moves this mechanism so as to move the mercury switch 201 from the "off" position shown in Figs. 42 and 43 to the "on" positions depicted in Figs. 3, 41 and 44.

Means is provided to latch this switch means with the mercury switch in the "on" position. This means comprises a latch member 214 having a toothed finger 215 at one end and a ratchet tooth 216 at the other end, the member being pivoted at 217 in a holder 218 which is itself pivoted at 219 in a supporting stud 220, a spring 221 acting on the holder to urge the same to the position shown in Fig. 43, a second spring 222 being arranged between a part of said holder and the latch member 214. Fixed to the oscillatable rod 203 is a lug tooth 223 adapted to mate with the toothed finger 215 of the latch member. When the switch is moved from the "off" position of Fig. 43 to the "on" position of Fig. 44, the lug tooth 223 is engaged by the tooth finger 215 of the latch member 214 as shown particularly in Fig. 44 and thereby the mercury switch is held in the "on" position.

Means is provided for automatically throwing the switch to the "off" position when a last record of a stack has been played (on its opposite sides). This means is made to comprise a lever 224 fulcrumed at 225 (see Fig. 41) on the outer end of the stop lever 136 adapted to be moved thereon to two positions, one of which is shown in Fig. 41, and to be held in these positions (except when positively moved) by means of an engaging pin 226 and a spring 227. The stop lever 136 is shown in Fig. 41 in four positions, $a'$, $a^2$, $a^3$, and $a^4$, corresponding to the following positions of the stop lever, namely, the stop position, the 12 inch record position, the 10 inch record position, and the home or cam held position. When the stop lever 136 is moved to its stop position $a'$, and this happens when the last record of a supply has been played on its opposite sides as above described, the stop lever is moved to the full line position shown in Fig. 41, at which time the lever 224 comes into engagement with a fixed abutment plate 228 which causes the lever 224 to be flipped over to its full line position shown in Fig. 41. This happens at the beginning of the last cam cycle. At the end of this cam cycle the cam moves the stop lever 136 to its $a^4$ position, and the lever 224 and particularly its tooth 229 comes in contact with the ratchet tooth 216 of the latch member 214 also engaging the latter as shown in Fig. 43, whereby the latch member 214 is moved to release the parts on which the mercury switch is mounted and thus the mercury switch is spring-moved to its "off" position. The lever 224 is held in this unlatching position by the latch member 214 until the next manual operation of the switch. When the switch is again manually operated, a pivoted pawl 230 retractable by the spring 231 is moved into engagement with the lever 224 as shown in Fig. 44 of the drawings and forces this lever from the latch member 214 and back into its other position on the stop lever. The movement of the pawl 230 upon the return motion of the switch mechanism is depicted in Fig. 45 of the drawings.

The leads 232 of the mercury switch 201 are connected to the motor 94 of the machine. Consequently when the manual arm 211 is moved to the position shown in Figs. 3 and 33, the motor is started, the switch mechanism being locked in its "on" position. When the second side of the last record of a supply has been played, the switch mechanism is restored automatically to its "off" position. In the model exemplified in the drawings, the tone arm means is at this time located for top side playing first. Therefore, in restarting the machine for a new load or supply or records, the main cam is first given a full cycle of movement so as to position the tone arm means for bottom side playing first and then the supply of records is positioned at the supply station.

For operating the machine after the motor is started, the trip or initiating mechanism is manually set. This is preferably done by the operation of the switch mechanism just described, and is accomplished by the following means. Mounted on the rod 203 is a link 233 provided with a flange 234 adapted to be engaged by the bent arm 206 to which link is pivoted an arm 236 controlled by a spring 237 and guided by a slotted element 238, the free end of said arm being adapted to engage the trip lever 175 of the trip mechanism, this latter being particularly shown in Fig. 19. These parts are so arranged as shown that after the mercury switch 201 is moved to the "on" position, a short over-travel of the operating manual 211 causes the bent arm 206 to engage the link flange 234 and move the arm 236 against the action of the spring 237 into engagement with the trip lever 175, thus tripping or initiating the operation of the main cam M. When the parts of the switch mechanism are released from this over-travel, they move back to the latched condition for the mercury switch.

As shown in Figs. 3 and 33, two other manuals are provided. The manual lever 239 fulcrumed on the shaft 212 connects a link 240 to a crank rod 241 to which the angle lever 89 is attached, the latter being interposed to operate the switch frog 80 when only top side playing of the machine is desired. Thus when the manual 239 is moved from the "off" position shown in Fig. 3 to the "on" position, the angle lever 89 is operated to permit top side playing only of a record or a record supply.

The third manual 242 also fulcrumed on the shaft 212 and connected to a link 243 is utilized for conditioning the machine for manual record operation. The link 243 is connected to a lever 244 having a terminal pin 245 which is arranged to engage the outer arm 180 of the carrier lever of the tripping mechanism, as best shown in Figs. 3 and 19. This manual 242 is adapted to be held in its "on" position by means of a pin 246 controlled by a spring 247 engaging the enlarged part of a slot 248 in the link 243 (such as shown also for link 240) (Fig. 33). The operated lever 244 is thereby adapted to be held in its position in engagement with the carrier arm of the trip mechanism and thereby the operated parts of the trip mechanism are held from being driven by the motor wheel 191. Consequently, the main cam will not be operated under these conditions and the machine is thereby conditioned to be used for the manual placing and playing of a record.

General Operation

The operation of the record changer phonograph of the present invention has been described above in connection with the different component mechanisms thereof, and the operation as well as interrelation between these mechanisms have also been detailed. Hence, at this point only the general operation of the machine might be restated. A load of intermixed records of different sizes is placed and supported at the supply station S, the record follower 158 being positioned so as to rest on the top record of the supply. The manual 211 is moved to the position shown in Fig. 3, whereupon the switch 201 is moved to and latched in the "on" position, thus energizing the motor 94. The manual 211 is then further moved to its over-travel position, whereupon the trip lever 175 is engaged and the trip mechanism is operated. This causes the motor wheel 191 to be engaged by the tripped friction wheel 193, thus connecting the motor wheel to the main cam M and the main cam is thereby moved through an operating cycle at the end of which the trip mechanism is restored and the wheel 193 disengaged from the motor wheel.

During this cycle of operation of the cam, the first record (the underneath record) of the record supply S is dropped to the playing station P and the tone arm B is moved to its initial playing position. This position is determined by the record which is dropped to the playing station, the tone arm being moved to play 10 and 12 inch records when 10 and 12 inch records are drop-fed, respectively, to the playing station P. The record 2 at the playing station P, in the first cycle of operation, is played at its underneath side as shown in Fig. 1 of the drawings, the tone arm B having moved in this cycle from top to bottom side playing position. During the playing of the record in this first cycle, the record 2 is rotated in the proper direction as indicated by the arrows in Fig. 1 (counter-clockwise) by the record rotating means C.

In this first cycle of operation of the main cam M, as the tone arm means B is moved from a top side playing position to a bottom side playing position, the record receiving and supporting means D, D' and D² are moved from the record supporting position to the non-record-supporting position depicted in Fig. 3 and are thereupon returned to the supporting position for intercepting and supporting the first fed record. This operation of the record supporting means D, D' and D² takes place every time the tone arm B is moved from a top side playing position to a bottom side playing position.

When the tone arm B reaches the terminal groove of the underneath side of the played record, the trip lever 175 is engaged either at its trip screw 184 or at its pawl 185 and the tripping mechanism is operated to initiate another and second cycle of rotation of the main cam. In this cycle of rotation, the tone arm B is moved from bottom side to top side playing position shown in Fig. 2. The record rotating means C is at the same time reversed in its operation so that the record is now rotated in the reverse direction (clockwise) for top side playing. Again the tone arm B is automatically set or positioned for a 10 inch record if a 10 inch record is at the playing station, or a 12 inch record if a 12 inch record is at the playing station, the means for determining the setting position of the tone arm being automatically held or maintained until both sides of the record have been determined or played.

During this second cycle of operation of the main cam M, the tone arm moving from bottom side to top side playing, only the tone arm playing means is moved through a record change cycle, the record feeding means A and D (D' and D²) being held inoperative.

In the next or third cycle of the operation of the main cam, the record 2 at the playing station drops to the record receiving station R and a new record is fed from the supply station S to the playing station P. Thus in every odd cycle or alternate cycle, the record feeding means is actuated along with the record playing means and in every successive cam operating cycle the record playing means is operated.

Upon feeding the last record of the supply S to the playing station P, the operating mechanism of the machine is so conditioned that after both sides of the last record have been played at the playing station and is drop-fed to the record receiving station, the mercury switch 201 is automatically released and the manual 211 is returned to the "off" position, thus stopping the motor and the machine. The stacked records at the record receiving station may be then bodily lifted and removed from the machine.

When at any time in the operation of the machine it is desired to play only the top side of a record or a series of records, the manual 239 is moved from its "off" to its "on" position. As a result, the tone arm B is automatically moved in each cycle to its top side playing position and the record feeding means is operated automatically in each cycle along with the record playing means instead of in alternate cycles.

When it is desired to play records manually, the operator merely moves the manual 242 and this renders inoperative the rotation of the main cam M.

The advantages incident to the use and operation of the record changer of the present invention are numerous and will be evident to those skilled in the art from the above description of structure, operation and produced results.

It will be apparent that many changes may be made in the machine and its various component mechanisms without departing from the spirit of the invention defined in the appended claims and in the claims of the copending applications which are divisionals of the present application.

We claim:

1. In a record changer phonograph, means for feeding records, tone arm means for playing the opposite sides of a record, cam mechanism for operating the tone arm means in successive cycles and the feeding means in alternate cycles, said cam mechanism comprising a first cam member connected to said tone arm means operable in successive cycles and having a first cam track for operating the tone arm means for one side playing of the record and a second cam track for operating the tone arm means for the opposite side playing of the record, a second cam member connected to said record feeding means for operating the feeding means, means for effecting the connection and disconnection of the second cam member to and from the first cam member and mechanism for operating said means for effecting connection when one of said two cam tracks of said first cam member is operative and for effecting disconnection when the other of said two cam tracks is operative.

2. The combination of claim 1 in which the said last-mentioned means comprises mating elements mounted on the first and second cam members.

3. The combination of claim 1 in which the first cam member and the second cam member are rotatable and are coaxially mounted.

4. The combination of claim 1 in which the first cam member is cylindrical and the cam tracks thereof are located in the cylindrical wall thereof and in which the second cam member is disc shaped and is mounted within the cylindrical cam member.

5. In a record changer phonograph, means for feeding records, tone arm means for playing the opposite sides of a record, cam mechanism for operating the tone arm means in successive cycles and the feeding means in alternate cycles, said cam mechanism comprising a first cam member operable in successive cycles having a first cam track for operating the tone arm means for one side playing of the record and a second cam track for operating the tone arm means for the opposite side playing of the record, a cam follower connected to said tone arm means cooperating with said cam tracks, a second cam member connected to said record feeding means for operating the feeding means, means for effecting the connection and disconnection of the second cam member to and from the first cam member, said means being operated by the cam follower.

6. The combination of claim 5 in which the said last-mentioned means comprises mating elements mounted on the first and second cam members.

7. The combination of claim 5 in which the said last-mentioned means comprises mating elements mounted on the first and second cam members, and in which the said mating elements are operated by the cam follower.

8. The combination of claim 5 in which the first cam member and the second cam member are rotatable and are coaxially mounted, in which the said last-mentioned means comprises mating elements mounted on the first and second cam members, and in which the cam follower when cooperating with one of said cam tracks operates said means to effect the disconnection of the said cam members.

9. The combination of claim 5 in which the said last-mentioned means comprises mating elements mounted on the first and second cam members, said mating elements acting to normally connect the second cam member to the first cam member, and in which the cam follower when cooperating with one of said cam tracks operates to disconnect the mating elements thereby rendering the second cam member inoperative.

10. The combination of claim 5 in which the said last-mentioned means comprises mating elements mounted on the first and second cam members, said mating elements acting to normally connect the second cam member to the first cam member when the said cam follower cooperates with one of said cam tracks, and in which the said mating elements are operated when the said cam follower cooperates with the other of said cam tracks to disconnect the cam members and thereby render the second cam member inoperative.

11. In a record changer phonograph, a record supporting and driving mechanism comprising a mount rotatable about an axis, a record supporting and driving wheel carried by and extending transversely from said mount and rotatable thereon about a transverse axis, means for rotating the mount about its axis for moving the said wheel between record supporting and non-supporting positions, and means for rotating said wheel around its transverse axis in either of opposite directions for rotating the supported record in one direction or the reverse direction, the last recited means comprising a motor element rotatable about the axis of the mount and a reversing clutch member connected to said driving wheel movable along said transverse axis into and out of engagement with said motor element.

12. In a record changer phonograph, a record supporting and driving mechanism comprising a mount rotatable about an axis, a record supporting and driving wheel carried by and extending transversely from said mount and rotatable thereon about a transverse axis, means for rotating the mount about its axis for moving the said wheel between record supporting and non-supporting positions, and means for rotating said wheel around its transverse axis in either of opposite directions for rotating the supported record in one direction or the reverse direction, the last recited means comprising a motor element independent of the mount rotatable about the axis of the mount and a reversing clutch member carried by the mount movable along said transverse axis into and out of engagement with said motor element.

MAXWELL JAMES.
BERNE N. FISHER.

REFERENCES CITED

The following references are of record in the file of this patent:

UNITED STATES PATENTS

| Number | Name | Date |
|---|---|---|
| Re. 22,551 | Andrews | Oct. 3, 1944 |
| 387,198 | Zobel | July 31, 1888 |
| 688,505 | Deibler | Dec. 10, 1901 |
| 1,547,768 | Little | July 28, 1925 |
| 1,838,101 | Mallina | Dec. 29, 1931 |
| 2,175,142 | Andres | Oct. 3, 1939 |
| 2,318,654 | Wissner | May 11, 1943 |
| 2,328,703 | Becwar | Sept. 7, 1943 |
| 2,457,668 | Hart | Dec. 28, 1948 |
| 2,506,523 | Stout | May 2, 1950 |
| 2,506,925 | Johnson | May 9, 1950 |
| 2,557,015 | Slater | June 12, 1951 |

FOREIGN PATENTS

| Number | Country | Date |
|---|---|---|
| 377,173 | Great Britain | Jan. 16, 1931 |
| 417,305 | Great Britain | Oct. 2, 1934 |
| 541,156 | Great Britain | Nov. 14, 1941 |
| 111,950 | Sweden | July 27, 1944 |